US011206141B2

(12) United States Patent
Block et al.

(10) Patent No.: US 11,206,141 B2
(45) Date of Patent: Dec. 21, 2021

(54) MERGING MULTIPLE COMPUTE NODES WITH TRUSTED PLATFORM MODULES UTILIZING PROVISIONED NODE CERTIFICATES

(71) Applicant: International Business Machines Corporation, Armonk, NY (US)

(72) Inventors: Timothy R. Block, Rochester, MN (US); Elaine R. Palmer, Hanover, NH (US); Kenneth A. Goldman, Norwalk, CT (US); Christopher J. Engel, Rochester, MN (US); William E. Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/138,804

(22) Filed: Sep. 21, 2018

(65) Prior Publication Data

US 2020/0099536 A1  Mar. 26, 2020

(51) Int. Cl.
*G06F 21/00* (2013.01)
*H04L 9/32* (2006.01)
(Continued)

(52) U.S. Cl.
CPC .......... *H04L 9/3268* (2013.01); *G06F 21/572* (2013.01); *G06F 21/62* (2013.01);
(Continued)

(58) Field of Classification Search
CPC ... H04L 9/3268; H04L 9/0877; H04L 9/3234; H04L 9/3236; H04L 2209/127; G06F 21/572; G06F 21/62
See application file for complete search history.

(56) References Cited

U.S. PATENT DOCUMENTS 5,371,852 A   12/1994  Attanasio et al.
7,146,497 B2  12/2006  Almeida et al.
(Continued)

FOREIGN PATENT DOCUMENTS

WO   2015147986 A1   10/2015

OTHER PUBLICATIONS

Nguyen et al., "Survey on secure communication protocols for the Internet of Things", Ad Hoc Networks, vol. 32, 2015, pp. 17-31.
(Continued)

*Primary Examiner* — Kendall Dolly
*Assistant Examiner* — Michael M Lee
(74) *Attorney, Agent, or Firm* — Matthew J. Bussan

(57) ABSTRACT

Method, apparatus, and computer program product are provided for merging multiple compute nodes with trusted platform modules utilizing provisioned node certificates. In some embodiments, compute nodes are connected to be available for merger into a single multi-node system. Each compute node includes a trusted platform module (TPM) provisioned with a platform certificate and a signed attestation key (AK) certificate and is accessible to firmware on the compute node. One compute node is assigned the role of master compute node (MCN), with the other compute node(s) each assigned the role of slave compute node (SCN). A quote request is sent from the MCN to each SCN under control of firmware on the MCN. In response to receiving the quote request, a quote response is sent from each respective SCN to the MCN under control of firmware on the respective SCN, wherein the quote response includes the AK certificate of the respective SCN's TPM.

25 Claims, 6 Drawing Sheets

(51) Int. Cl.
*H04L 9/08* (2006.01)
*G06F 21/57* (2013.01)
*G06F 21/62* (2013.01)

(52) U.S. Cl.
CPC .......... *H04L 9/0877* (2013.01); *H04L 9/3234* (2013.01); *H04L 9/3236* (2013.01); *H04L 2209/127* (2013.01)

(56) References Cited

U.S. PATENT DOCUMENTS

| | | | |
|---|---|---|---|
| 7,779,244 B2 | 8/2010 | Zimmer et al. | |
| 8,589,672 B2 | 11/2013 | Dasari et al. | |
| 8,694,762 B2 | 4/2014 | Ekberg | |
| 9,223,982 B2 | 12/2015 | Adams et al. | |
| 9,413,765 B2 | 8/2016 | Swanson et al. | |
| 9,448,615 B2 | 9/2016 | Larson et al. | |
| 9,448,950 B2 | 9/2016 | Scarlata et al. | |
| 9,465,943 B2 | 10/2016 | Paris et al. | |
| 9,582,351 B2 | 2/2017 | Boecker et al. | |
| 9,608,825 B2 | 3/2017 | Sarangdhar et al. | |
| 9,633,196 B2 | 4/2017 | Lin et al. | |
| 9,720,704 B2 | 8/2017 | Reick et al. | |
| 9,766,900 B2 | 9/2017 | Gundam et al. | |
| 9,767,289 B2 | 9/2017 | Martinez | |
| 9,857,998 B2 | 1/2018 | Lobo et al. | |
| 9,916,476 B2 | 3/2018 | Dasari et al. | |
| 10,885,197 B2 | 1/2021 | Block et al. | |
| 2005/0071625 A1* | 3/2005 | Schwartz | G06F 15/177 713/100 |
| 2007/0101138 A1 | 5/2007 | Camenisch | |
| 2008/0162873 A1 | 7/2008 | Zimmer et al. | |
| 2009/0007104 A1 | 1/2009 | Zimmer et al. | |
| 2010/0082984 A1* | 4/2010 | Ellison | H04L 9/3236 713/170 |
| 2010/0125731 A1 | 5/2010 | Dasari et al. | |
| 2011/0302425 A1 | 12/2011 | Saripalli | |
| 2012/0030730 A1* | 2/2012 | Smith | G06F 21/85 726/2 |
| 2012/0163589 A1 | 6/2012 | Johnson et al. | |
| 2015/0235263 A1 | 8/2015 | Bodz et al. | |
| 2015/0281237 A1 | 10/2015 | Swanson et al. | |
| 2015/0294116 A1 | 10/2015 | Gundam et al. | |
| 2015/0294119 A1 | 10/2015 | Gundam et al. | |
| 2016/0127193 A1 | 5/2016 | Deniaud et al. | |
| 2016/0142212 A1 | 5/2016 | Sarangdhar et al. | |
| 2016/0147675 A1 | 5/2016 | Lin et al. | |
| 2016/0306975 A1* | 10/2016 | Schmidt | G06F 21/57 |
| 2016/0323284 A1 | 11/2016 | Swanson et al. | |
| 2017/0019251 A1 | 1/2017 | Jain et al. | |
| 2017/0041147 A1* | 2/2017 | Krahn | H04L 9/3268 |
| 2017/0054707 A1 | 2/2017 | Leicher et al. | |
| 2017/0061163 A1 | 3/2017 | Dasari et al. | |
| 2017/0187799 A1* | 6/2017 | Pogorelik | H04L 67/2833 |
| 2017/0302459 A1* | 10/2017 | Fenner | H04L 9/321 |
| 2017/0318056 A1 | 11/2017 | Georges et al. | |
| 2018/0091312 A1* | 3/2018 | Thom | H04L 9/3234 |
| 2018/0246732 A1* | 8/2018 | Puri | H04L 9/3242 |
| 2019/0138294 A1* | 5/2019 | Smith | G06F 21/44 |
| 2019/0312851 A1* | 10/2019 | Campagna | H04L 63/0823 |
| 2019/0332391 A1 | 10/2019 | Ndu et al. | |
| 2020/0067912 A1 | 2/2020 | Block et al. | |
| 2020/0097661 A1 | 3/2020 | Block et al. | |
| 2020/0099536 A1 | 3/2020 | Block et al. | |

OTHER PUBLICATIONS

Heller et al., "OpenPOWER secure and trusted boot, Part 1: Using trusted boot on IBM OpenPOWER servers", 13 pages, downloaded from <https://www.ibm.com/developerworks/library/I-trusted-boot-openPOWER-trs/I-trusted-boot-openPOWER-trs-pdf.pdf> on Aug. 28, 2018.

Fongen et al., "Attested Genuineness in Service Oriented Environments", The Third International Conference on Digital Information Processing and Communications, 2013, pp. 8-17.

U.S. Appl. No. 16/138,871, to Timothy R. Block et al., entitled "Merging Multiple Compute Nodes With Trusted Platform Modules Utilizing Authentication Protocol With Active Trusted Platform Module Provisioning", filed Sep. 21, 2018, assigned to International Business Machines Corporation.

List of IBM Patents or Patent Applications Treated as Related (Dated Sep. 22, 2018).

U.S. Appl. No. 16/106,069, to Timothy R. Block et al., entitled "Implementing Authentication Protocol for Merging Multiple Server Nodes With Trusted Platform Modules Utilizing Provisioned Node Certificates To Support Concurrent Node Add and Remove", filed Aug. 21, 2018, assigned to International Business Machines Corporation.

List of IBM Patents or Patent Applications Treated as Related (dated Aug. 12, 2021).

* cited by examiner

US 11,206,141 B2

MERGING MULTIPLE COMPUTE NODES WITH TRUSTED PLATFORM MODULES UTILIZING PROVISIONED NODE CERTIFICATES

BACKGROUND

1. Field of the Invention

The present invention relates in general to the field of data processing systems. More particularly, the present invention relates to enhancing security in multi-node systems while merging compute nodes with trusted platform modules by utilizing provisioned node certificates.

2. Background of the Related Art

Compute nodes may be scaled together and work together as a single multi-node system (also known as a "scale up server" or a "multi-node SMP server"). Each node within the multi-node system typically has a trusted platform module (TPM) and stores security settings in the TPM. For example, the TPM is typically installed on a server's motherboard in some fashion along with processors and memory to comprise a single compute node. For enterprise class servers, multiple TPMs (e.g., a primary TPM and an alternate TPM that is synchronized with the primary TPM) may be installed as part of a single node architecture to provide Reliability and Serviceability (RAS) support to prevent single points of failure.

A "trusted platform module" (TPM) is a processor chip that implements a specification published by the Trusted Computing Group (TCG) detailing a secure crypto-processor that can store cryptographic keys that protect information. A trusted platform module offers a number of capabilities, including "remote attestation" whereby the local host server authenticates its hardware and software configuration to a trusted remote server, making use of nearly unforgeable hashes of hardware and software configuration kept within the TPM. If it is detected that a hash has changed, then this indicates that the hardware or software configuration has been modified and trust may be lost.

Many server architectures make use of a TPM to establish a root of trust chain for firmware which is anchored in hardware. The TPM implements a small cryptographic engine which provides basic building blocks for the creation of a firmware root of trust, the architecture of which comes from the Trusted Computing Group's (TCG) TPM specification.

The merging of multiple nodes for an enterprise server, for example, may be done to provide a single server view (image) with enhanced processor and memory capabilities to meet high end demands. The merging of nodes is typically accomplished under the control of a service processor, such as a flexible service processor (FSP). The service processor is typically treated as being in a separate security domain from the security domain of the host system with its processors, memory, and TPM(s).

The advent of a service processor controlled node merge operation where the service processor is either untrusted, or at least not trusted to the same level as the host security domain, leaves the merge process vulnerable to certain security threats.

Threats that may need to be considered for the multi-node server environment include spoofing (node impersonation if lacking authentication of nodes), tampering (integrity of node protocol messages thereby exposing threat of relay and replay attacks by an evil service processor or exploited hypervisor), information disclosure, denial of service, multiple master attacks, and code and TPM event log integrity issues.

SUMMARY

Embodiments disclose a method, an apparatus, and a computer program product for merging multiple compute nodes with trusted platform modules utilizing provisioned node certificates. In accordance with one or more embodiments, multiple compute nodes are connected so as to be available for merger into a single multi-node system. Each compute node includes a trusted platform module (TPM) provisioned with a platform certificate and a signed attestation key (AK) certificate and is accessible to firmware on the compute node. One of the compute nodes is assigned the role of master compute node (MCN), with the other compute node(s) each assigned the role of slave compute node (SCN). A quote request is sent from the MCN to each SCN under control of firmware on the MCN. In response to receiving the quote request, a quote response is sent from each respective SCN to the MCN under control of firmware on the respective SCN, wherein the quote response includes the AK certificate of the respective SCN's TPM.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
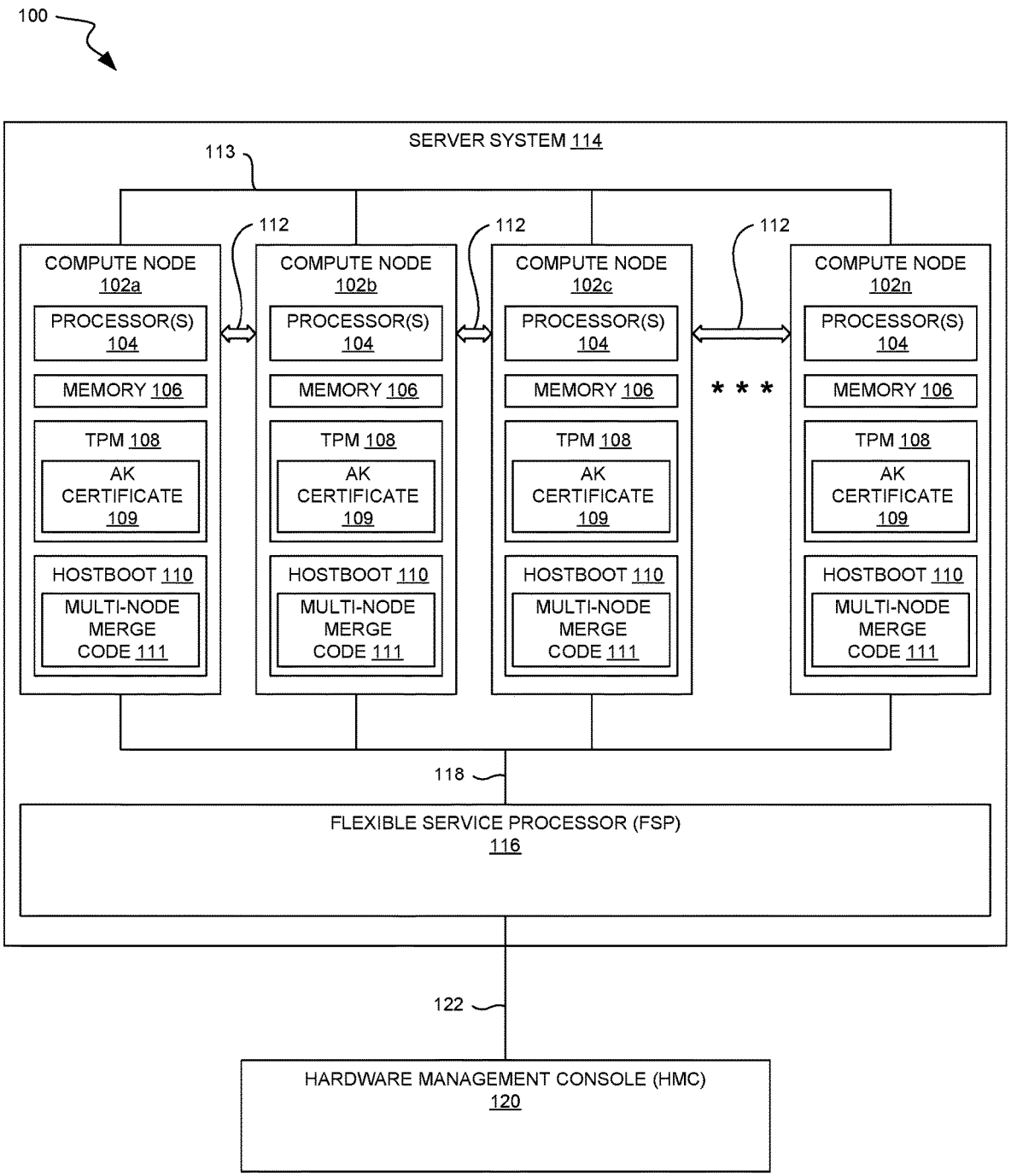
FIG. 1 is a block diagram of multiple compute nodes forming a single multi-node system, in accordance with one or more embodiments.

An authentication protocol for merging multiple compute nodes with multiple trusted platform modules (TPMs), in accordance with one or more embodiments, makes use of a TPM provisioning process that includes attestation key enrollment at manufacturing TPM provisioning time. In accordance with one or more embodiments, the creation and storage of a signed attestation key (AK) certificate (also referred to herein as a "provisioned node AK certificate" and "provisioned node certificate") in the TPM(s) for each compute node is done prior to any multi-node merge operation. Although these provisioned AK certificates consume additional TPM non-volatile random access memory (NVRAM) space, their availability for utilization in an authentication protocol for merging multiple compute nodes, in accordance with one or more embodiments, can be highly advantageous. For example, utilization of these provisioned AK certificates can significantly reduce the amount of authentication and certificate handling work that must be done on the master and slave compute nodes—which can be highly advantageous because, at system boot, an authentication protocol for merging multiple compute nodes, in accordance with one or more embodiments, runs in low level firmware that provides a limited environment for certificate handling and a less than full TPM command suite.

Node-to-node messages are exchanged pursuant to an authentication protocol for merging multiple compute nodes, in accordance with one or more embodiments, low in the firmware stack before Inter-node memory buses are coupled or system network connectivity exists. Also, in accordance with one or more embodiments, a secure channel between nodes is utilized to exchange an initial secret as a prelude to further node-to-node messaging. Further node-to-node messaging subsequent to exchange of the initial secret may use the secure channel, in accordance with some embodiments. In accordance with other embodiments, further node-to-node messaging subsequent to exchange of the initial secret may use a less secure channel (e.g., an untrusted service processor conduit) that may have more robust data throughput than the secure channel.

In accordance with one or more embodiments, an authentication protocol for merging multiple compute nodes with multiple TPMs with provisioned node certificates makes use of a hardware secure channel established between compute nodes for firmware message passing as part of the physical configuration of nodes to be merged. The hardware secure channel may be employed in lieu of firmware message passing between compute nodes through an untrusted service processor conduit. One skilled in the art will appreciate, however, that the authentication protocol, in accordance with one or more other embodiments, may be adapted (e.g., with additional protocol steps to maintain message integrity) for implementation where firmware message passing between compute nodes occurs through an untrusted service processor conduit or through any other untrusted connection.

An authentication protocol for merging multiple compute nodes with multiple TPMs with provisioned node certificates, in accordance with one or more embodiments, establishes a quote request/response flow between an assigned master compute node and all slave compute nodes that participate in the merge process. This flow allows for the master compute node to securely collect the necessary information from the slave compute node TPM(s). This information, in accordance with one or more embodiments, is managed on the master compute node upon receipt. In accordance with one or more embodiments, the hash of the quote response is extended to the master compute node's TPM(s) and the full quote response blob (not the hash of the quote response) is logged to the master compute node's TPM event log and information fields cached in protected memory locally on the master compute node. The necessary information may be subsequently provided to a remote trusted third party via what is a well-known remote attestation process to enable the third party to confirm authenticity of the slave compute nodes post initial program load (IPL) but before secure workloads are loaded. Alternatively, the master compute node firmware may be charged with performing this confirmation of node authenticity.

In accordance with one or more embodiments, firmware IPL history is exchanged between the compute nodes in the multi-node system in such a way that any TPM in the multi-node system can take on the role of the master TPM (e.g., any compute node in the multi-node system can be assigned as the master compute node and any TPM on the assigned master compute node may take on the role of the master TPM) and can provide full attestable history (current IPL and any concurrent firmware updates, but not previous IPLs) of the firmware run on that system to a remote trusted third party.

An authentication protocol for merging multiple compute nodes with multiple TPMs with provisioned node certificates, in accordance with one or more embodiments, enhances the prior art by addressing the threats cited earlier for the multi-node server environment including spoofing (node impersonation if lacking authentication of nodes), tampering (integrity of node protocol messages thereby exposing threat of relay and replay attacks by an evil service processor or exploited hypervisor), information disclosure, denial of service, multiple master attacks, and code and TPM event log integrity issues.

In accordance with one or more embodiments, an authentication protocol for merging multiple compute nodes with multiple TPMs with provisioned node certificates may be implemented in either an environment that utilizes a single TPM per compute node or an environment that utilizes multiple TPMs per compute node (e.g., each compute node may include a primary TPM and an alternate TPM synchronized with the local primary TPM (identically extended by firmware, and being associated with a common TPM event log)).

An authentication protocol for merging multiple compute nodes with multiple TPMs with provisioned node certificates, in accordance with one or more embodiments, is implemented while merging compute nodes at system boot. One skilled in the art will appreciate, however, that the authentication protocol, in accordance with one or more other embodiments, may be adapted for implementation at other times while merging compute nodes.

Before continuing it is helpful to briefly discuss trusted platform modules (TPMs), platform configuration registers (PCRs), integrity measurements, quotes, remote attestation, and core root of trust for measurement (CRTM). IBM® OpenPOWER servers provide a firmware-level security feature known as Trusted Boot. IBM® is a registered trademark of International Business Machines Corporation ("IBM") in the United States. Trusted Boot helps a user to verify that the user's server is running only authorized firmware components from IBM or another trusted vendor. This allows the user to detect and take corrective action in case of a boot code cyberattack—that is, any attempt to replace the user's trusted firmware with malicious code. If an attacker can inject malicious code at the firmware level, no amount of protection within the operating system can prevent the attacker from gaining control of the user's system.

Trusted Boot works by requiring the firmware to take a series of recordings, or measurements, as the server boots. Each measurement is a secure hash (e.g., SHA256 or SHA512) of a particular boot code component (typically, an executable firmware image) as the component is loaded from flash memory, before the component runs on the system processor. Each executable image measures the next before passing control to that next image. The measurement may also be a hash of some important configuration data, such as the properties that determine the server's default boot device. A "hash" or "hash function", such as the secure hash algorithms (SHA256 and SHA512), is a well-defined procedure or mathematical function that turns some kind of data into a relatively small integer. A good hash function will be deterministic, meaning the two identical or equivalent inputs will generate the same hash value. In accordance with TCG specifications, if the hash of certain program code is different than the previous hash of that program code, then the code has been altered in some way and should not be trusted.

The measurements are recorded in a dedicated security processor known as the trusted platform module (TPM). The TPM ensures that the measurements are stored securely, in a manner where they cannot be erased (until the next reboot) and cannot be easily counterfeited. The TPM has several dedicated registers, which are called platform configuration registers (PCRs), allocated to hold the measurements. Each PCR contains a cryptographic history (in the form of a hash value) of all the measurements extended to the PCR. The extend operation is used by the TPM to add a measurement to a PCR. The TPM ensures that a specific series of measurements, in a specific order, will always produce this same resultant value—the digest value—of the PCR. And, it is virtually impossible to produce a given digest value without having the TPM extend that exact series of measurements, in the exact order.

After the server boots to the target OS or hypervisor, it is possible to connect the server over the network and to ask the server for a list of all PCR digest values and a list of all the measurements that were recorded by the TPM. The list of PCR digest values is called the "PCR digest list" and the list of measurements is referred to as the "boot-time measurement log" or "TPM event log". The process of asking the TPM for a signed digest (report) consisting of the requested PCR states is known as requesting a "quote". For example, an "attestation server" may request a quote from the server during a process known as "remote attestation", discussed below. The TPM neither holds nor has any awareness of the TPM event log. The TPM event log is neither secret nor protected—if the TPM event log is altered, the attestation server will not be able recreate the values of the PCRs as reported in the quote from the TPM when verifying the TPM event log by replaying the measurements and comparing the calculated PCR values to those in the quote.

When the TPM creates a quote, the TPM cryptographically signs the digest list in a manner that can be independently verified, using a key that can be validated as belonging to the unique TPM that created the quote. This key, in turn, is signed by a key that can be linked to the TPM's manufacturer or vendor. The key used to link the TPM to the TPMs vendor is known as the endorsement key (EK), and the key that is used to sign the quote is known as the attestation key (AK). The TPM generates this attestation key (AK), as discussed below, for the purpose of signing the quote.

After the quote has been retrieved from the TPM, and the endorsement key EK and attestation key AK verified, the PCR data can be used to verify that the server has booted only the expected boot code and configuration. Any deviation will create an unexpected PCR digest value (either with respect to a PCR digest value from a list of published values and/or a mismatch when attempting to replay the TPM event log's claimed measurement values) which can be detected when examining the quote. This process of retrieving and verifying a quote is known as remote attestation.

A user must be able to trust the components that create the measurements recorded in the TPM, or else the system from which the quote was received may already be compromised and could be deceptive about what was measured. This problem is solved by establishing a core root of trust for measurement (CRTM) anchored in hardware. For example, a CRTM may be created using a Secure Boot feature that adds cryptographic checks in each phase of the initial program load (IPL) process until communication with the TPM is established. The Secure Boot flow ensures the integrity of all firmware that must be run on core processors, thus preventing any unauthorized or maliciously modified firmware from running. A failure to authenticate the code at any point prevents the IPL process from reaching completion.

At this point, it is helpful to briefly discuss how the TPM handles keys in the context of remote attestation. Every TPM contains a unique, burned-in endorsement key (EK) (or Endorsement Primary Seed and an EK certificate from which an EK public key can be re-created) that is signed by a Root Endorsement Key belonging to the TPM vendor. This signature over the (public part) of the TPM's EK is stored in an X509 certificate, pre-installed in the TPM, and this EK certificate is one of the first bits of information the client server sends to the attestation server when sending a quote. The Root EK certificate is a publicly available X509 certificate that can be obtained from the TPM vendor and imported into the attestation server truststore. When the client server sends the client server's EK certificate, the attestation server can easily check the client server's EK certificate against the root EK certificate and verify that this key belongs to a TPM manufactured by this vendor. Note that the attestation server does not yet know this key belongs to any particular TPM, only one from this vendor.

The TPM does not use the EK to sign the quote; the TPM generates an attestation key (AK) for this purpose. The client server sends the public part of this AK to the attestation server at the same time the client server sends the client server's EK certificate.

It is important to note that the private parts of these two keys, the EK and the AK, are contained within the TPM and cannot be extracted. These keys can only be used by the TPM and only in a manner intended by the TPM designer. This is why it is important to know that the TPM came from a trusted vendor. If the keys could be extracted and used externally, it would be easy for another TPM-like function to masquerade as this TPM and destroy the authenticity of the quoted information.

After the attestation server has received the public parts of the EK and AK, the attestation server can create a challenge to verify whether the client server's TPM is truly the holder of these keys. This allows the client server to complete what is referred to as the enrollment. In essence, the challenge is constructed so that the client server must have the private portions of both keys to complete the challenge. Additionally, the challenge is performed in a way that can only be completed on the client server's TPM; that is, the challenge cannot be performed in software on the client server.

Contained in the challenge is a secret encrypted with the client server's public EK. Also contained in the challenge is a reference to the client server's public AK, known as the key name. The client server's TPM will reject the challenge if the name does not match the client server's true AK. After the client server decrypts and returns the secret, the attestation server can be sure that the client server has performed the operation on a genuine, trusted vendor's TPM and that the attestation key (AK) can be trusted. When this is completed, the client server is enrolled at the attestation server.

It is important to note that the above-mentioned attestation key (AK), which is generated by the TPM for the purpose of signing the quote, is distinct from the primary attestation signing key (AK) used to sign a signed attestation key (AK) certificate that is pre-installed in every TPM, in accordance with one or more embodiments. Optionally, in accordance with one or more embodiments, every TPM may additionally contain the primary attestation signing key (AK) used to sign the pre-installed signed attestation key (AK) certificate. That is, both the signed attestation key (AK) certificate and the primary attestation signing key (AK) used to sign it may be burned into the TPM at manufacturing TPM provisioning time.

FIGS. 1-5 describe embodiments of the present invention implemented in a multi-node system that utilizes the Secure Boot feature. For Secure Boot, the CRTM code is based on self boot engine/Hostboot (SBE/HB). One skilled in the art will appreciate, however, that aspects of the present invention may be utilized in conjunction with other root of trust for measurement (RTM) models, such as a static RTM model. In a static RTM model, the CRTM code, which is typically included in the basic input output system (BIOS), must be run first when the server or the physical hardware environment is powered on, or when the server or physical hardware environment is reset. Aspects of the present invention may be adapted for implementation in a multi-node system that utilizes a RTM model other than Secure Boot, such as a static RTM model.

FIG. 1 is a block diagram of multiple compute nodes 102a-n forming a single multiple-node system 100 (also known as a "scale up server" or a "multi-node SMP server"), in accordance with one or more embodiments. A "multi-node SMP server" is a symmetric multiprocessing (SMP) server having multiple compute nodes in which multiple processors share the system memory. Many of the components of the compute nodes 102a-n (such as those discussed below with reference to the compute node 200 of FIG. 2, the compute nodes Node_0, Node_1 of FIG. 3, and the computing platform 600 of FIG. 6, which may be used to implement one or more of the compute nodes 102a-n) are not shown in FIG. 1 in order to highlight components that implement one or more embodiments. It should be recognized that the compute nodes 102a-n may have, but are not required to have, identical hardware and perhaps also identical firmware and software. As shown, the first compute node (COMPUTE NODE 102a), the second compute node (COMPUTE NODE 102b), the third compute node (COMPUTE NODE 102c), and the n-th compute node (COMPUTE NODE 102n) each have one or more processors 104, memory 106, at least one trusted platform module (TPM) 108, and Hostboot code 110, although they may be different.

For example, each compute node 102a-n may include four CPUs 104 and memory 106 on a compute node motherboard (not shown), along with at least one TPM 108 (e.g., a primary TPM and an alternate TPM synchronized with the local primary TPM) and Hostboot code 110. In one or more embodiments, the four CPUs on each compute node motherboard may include a master processor and three slave processors (which may include an alternate master processor). For example, the master processor in the compute node may be physically attached to a processor NOR (PNOR) flash memory (210 in FIG. 2). Each CPU may have, for example, twelve cores (not shown). In one or more embodiments, the twelve cores of each CPU may include a primary master core and eleven slave cores (which may include an alternate master core). In one or more embodiments, a server system 114 may accommodate, for example, four compute node motherboards, each incorporating a compute node 102, as well as accommodating at least one flexible service processor (FSP) 116 (e.g., a primary FSP and a backup FSP synchronized with the primary FSP).

The compute nodes 102a-n are scaled together by a connection 112 to form a single multi-node system 100. Although four of the compute nodes 102 are shown in FIG. 1, the single multi-node system 100 may comprise any plural number (i.e., two or more) of compute nodes 102. Only one of the compute nodes 102 may be the master compute node at any one point in time, and the other compute node(s) are the slave compute nodes. The multi-node system 100 will boot, in accordance with one or more embodiments, utilizing an authentication protocol that establishes a quote request/response flow between an assigned master compute node and all slave compute nodes that participate in the merge process.

The compute nodes 102a-n may be, for example, scaled together by a scalability connection 112 to form the single multi-node system 100 using node controller/memory controller chip designs or "chip sets" that include scalability ports. The scalability ports, which are included in each compute node, are used for connecting each of the compute nodes into the single multi-node system.

A secure trusted communications channel 113, in accordance with one or more embodiments, is utilized to communicate node-to-node messages between the compute nodes to be merged (e.g., the compute nodes 102a-n) in an authentication protocol for merging those nodes. The node-to-node messages employed in the authentication protocol are sent, in accordance with one or more embodiments, via processor registers (e.g., "A-Bus" Mailbox Registers 270 in FIG. 2, described below) and the secure trusted communications channel 113. The secure trusted communications channel 113 may include, for example, one or more portions of at least one "A-Bus" (shown in FIG. 3) hardwired on the processor chips of the compute nodes and one or more portions of at least one "SMP Cable" (shown in FIG. 3), described below, directly connected between like-positioned processor chips of respective compute nodes. The node-to-node messages employed in the authentication protocol may be, for example, 8-byte transfers, with a transfer time of approximately 1-2 microseconds per 8-byte.

The compute nodes 102a-n may be connected together so as to be available for merger into the single multi-node system by using processor registers and the secure trusted communications channel 113 in the form of one or more hardwired buses (one or more portions thereof) and/or one or more secure trusted cables (one or more portions thereof) directly connected between like-positioned processor chips of respective compute nodes. The secure trusted communications channel 113 is trusted because each of the one or more buses (e.g., the "A-Bus" in FIG. 3) is hardwired on the processor chips of the compute nodes and the one or more secure trusted cables (e.g., the "SMP Cable" in FIG. 3) is/are directly connected thereto (i.e., direct processor chip connections).

The compute nodes 102a-n of the multi-node system 100 may be fully meshed, which means that there is a scalability cable and/or a secure trusted cable coupled directly between each pairing of nodes 102a-n within the multi-node system 100. Specifically, wherein there are n nodes, a fully meshed system will require (n−1)n/2 scalability and/or secure trusted cables.

As shown in FIG. 1, in one or more embodiments, all of the compute nodes 102a-n forming the single multi-node system 100 may be included in a single server system 114.

In one or more other embodiments, the compute nodes forming the single multi-node system may be included in multiple server systems.

In accordance with one or more embodiments, the server system 114 may also include at least one flexible service processor (FSP) 116. A flexible service processor includes firmware that provides diagnostics, initialization, configuration, and run-time error detection and correction. The flexible service processor 116 is connected to each of the compute nodes 102a-n through a communication bus 118.

When the flexible service processor 116 selects one of the compute nodes 102a-n as the master compute node, all other compute nodes become slave compute nodes. Typically, the compute node having the lowest node ID (e.g., Node_0) is assigned as the master compute node by the flexible service processor. The flexible service processor 116 connects the managed computer system (e.g., the server system 114) to a hardware management console (HMC) 120 through a HMC to managed server connection 122.

Although the server system 114 is shown in FIG. 1 as including only a single flexible service processor (FSP) 116, additional FSPs (e.g., a backup FSP) may be included in server system 114. Similarly, although only a single hardware management console (HMC) 120 is shown in FIG. 1, additional HMCs (e.g., a backup HMC) may be employed as well.

Figure 2:
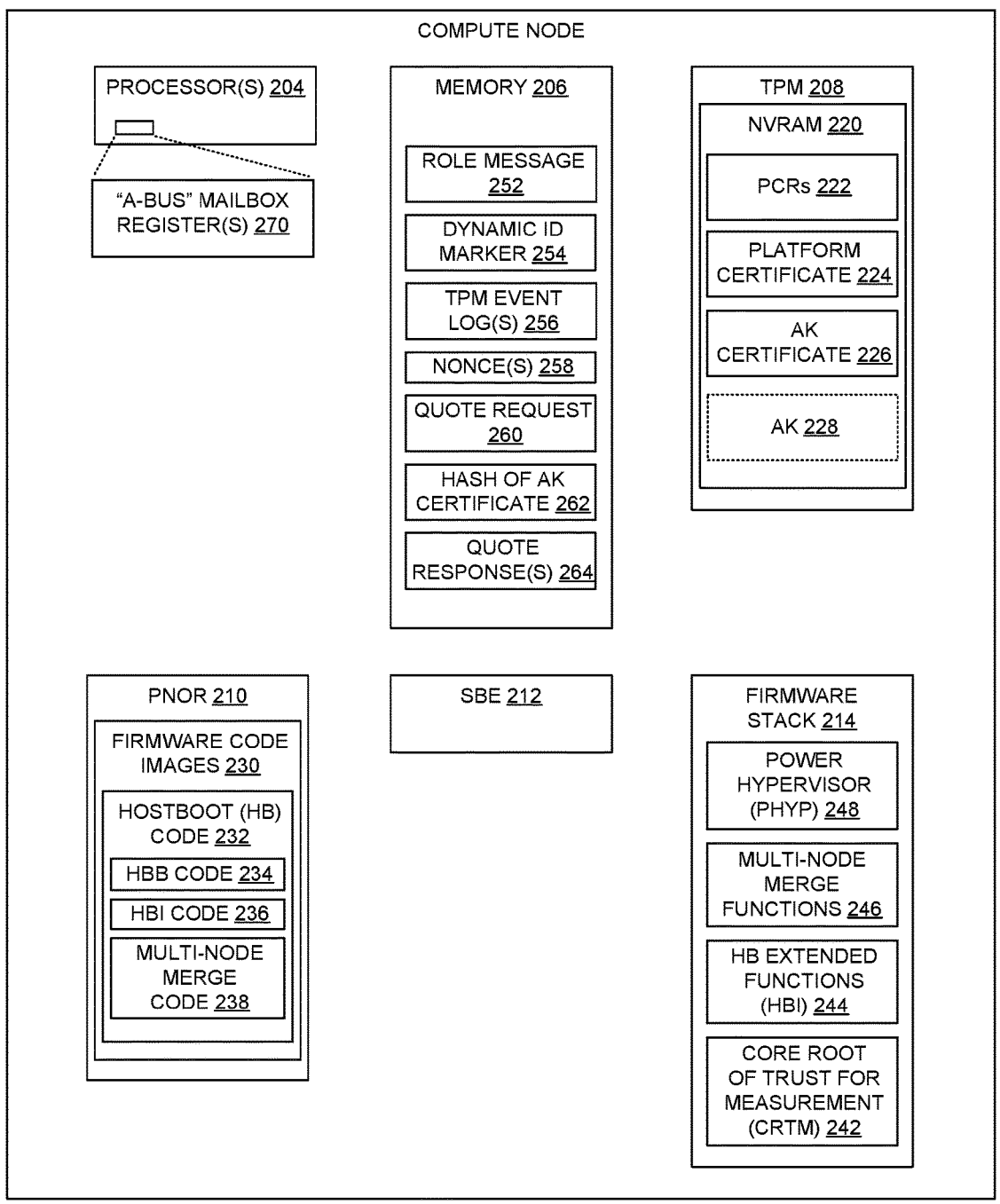
FIG. 2 is a block diagram of an illustrative compute node, in accordance with one or more embodiments.

The TPM 108 of each of the compute nodes 102a-n includes non-volatile random access memory (NVRAM) (e.g., NVRAM 220 in FIG. 2). Security settings can be stored in the NVRAM of the TPM 108, or can be stored outside of the TPM 108 (but within each of the compute nodes 102a-n) in another NVRAM. In accordance with one or more embodiments, the non-volatile random access memory of the TPM 108 of each compute node 102a-n includes a signed attestation key (AK) certificate 109 (e.g., 226 in FIG. 2) created by the TPM 108 utilizing a network connection to a trusted certificate authority (CA) and stored in the TPM 108 at manufacturing TPM provisioning time.

Hostboot code 110 of each of the compute nodes 102a-n is firmware that runs on the host processors to initialize the memory and processor bus during initial program load (IPL). For example, Hostboot firmware performs memory initialization and other tasks in IBM® POWER® based systems. IBM® and POWER® are registered trademarks of International Business Machines Corporation ("IBM") in the United States. Hostboot code 110, in accordance with one or more embodiments, runs during IPL to initialize processors and memory and buses, and actually goes away before hypervisors and OSs run. A component of Hostboot firmware distinct from Hostboot code 110, known as Hostboot Runtime Services, provides runtime services. In accordance with one or more embodiments, Hostboot code 110 includes multi-node merge code 111 (e.g., 238 in FIG. 2) that implements an authentication protocol (or portions thereof) for merging multiple compute nodes (e.g., compute nodes 102a-n) with multiple TPMs 108 utilizing the provisioned node AK certificates 109.

FIG. 2 is a block diagram of an illustrative compute node 202, in accordance with one or more embodiments. One or more compute nodes 102a-n of FIG. 1 may include some or all of the components of the compute node 202 illustrated in FIG. 2.

As illustrated, the compute node 202 may include one or more processors 204, memory 206, at least one trusted platform module (TPM) 208, a processor NOR (PNOR) flash memory 210 (which contains firmware images 230, including Hostboot code 232), a self boot engine (SBE) 212, and a firmware stack 214. The one or more processors 204, the memory 206, the at least one TPM 208, and Hostboot code 232 of FIG. 2 may respectively correspond to the one or more processors 104, the memory 106, the at least one TPM 108, and Hostboot code 110 illustrated in FIG. 1.

The one or more processors 204 may include, for example, four CPUs. These four CPUs may include, for example, a master processor and three slave processors (which may include an alternate master processor). For example, the master processor (and the alternate master processor) in the compute node 202 may be physically attached to PNOR flash memory 210 by, for example, a serial peripheral interface (SPI) bus. Each CPU may have, for example, twelve cores (not shown). In one or more embodiments, the twelve cores of each CPU may include a primary master core and eleven slave cores (which may include an alternate master core).

The memory 206 can include computer readable media in the form of non-volatile memory, such as a non-volatile random access memory (NVRAM), and volatile memory, such as random access memory (RAM) and/or cache memory. The memory 206 may further include other removable/non-removable, volatile/non-volatile computer system storage media. In accordance with one or more embodiments, the memory 206 may be employed to store, at least temporarily, a copy of programming instructions implementing the method 400 of FIG. 4 (or portions thereof) and/or the authentication protocol 500 of FIG. 5 (or portions thereof). Also, in accordance with one or more embodiments, the memory 206 may be employed to store, at least temporarily, information (e.g., one or more FSP-to-node messages, one or more node-to-node messages, one or more TPM event logs, one or more nonces, one or more hashes of the provisioned node AK certificates, etc.) used in implementing the method 400 of FIG. 4 and/or the authentication protocol 500 of FIG. 5. For example, the memory 206 may be employed to store, at least temporarily (cache), a master/slave role message 252 (or portions thereof), a Dynamic ID marker 254, one or more TPM event log(s) 256, one or more nonce(s) 258, a quote request 260 (or portions thereof), a hash of the provisioned node AK certificate 262, and one or more quote response(s) 264 (or portions thereof). A "Dynamic ID marker" is a node ID (e.g., Node_0) assigned to a compute node by a service processor (e.g., FSP 116 in FIG. 1) in a dynamic manner—accordingly, a particular compute node assigned the lowest node ID need not retain that distinction when the service processor assigns node IDs during subsequent IPLs. The memory 106 of FIG. 1 may include some or all of the components of the memory 206 illustrated in FIG. 2.

In accordance with one or more embodiments, the above-mentioned copy of programming instructions (implementing the method 400 of FIG. 4 and/or the authentication protocol 500 of FIG. 5) and/or the above-mentioned information (used in implementing the method 400 of FIG. 4 and/or the authentication protocol 500 of FIG. 5) may be stored, at least temporarily (cached), within protected memory of the memory 206. For example, the one or more quote response(s) 264 may be maintained in protected main system memory. Protected memory is a memory region that is accessible (read and write) only by trusted code. Also, access to protected memory may be blocked by hardware isolation mechanisms.

The at least one TPM 208 may include, for example, a single TPM as illustrated in FIG. 2, or multiple TPMs used in a redundant (non-transparent) manner, such as a primary TPM and an alternate TPM that is synchronized (i.e., driven by common Hostboot code such that extends and associated TPM log entries match) with the local primary TPM. One skilled in the art will appreciate, however, that a new TPM entails a new EK, which in turn necessitates re-enrollment. The TPM 208 includes non-volatile random access memory (NVRAM) 220. The NVRAM 220 contains platform configuration registers (PCRs) 222, a platform certificate 224, and a signed attestation key (AK) certificate 226. The platform certificate 224 and the provisioned node AK certificate 226 are created by the TPM 208 utilizing a network connection to a trusted certificate authority (CA) and stored in the TPM 208 at manufacturing TPM provisioning time. Optionally, the TPM 208 may additionally contain a primary attestation signing key (AK) 228 (also referred to herein as a "primary attestation key" and "primary AK") used to sign the provisioned node AK certificate 226. The primary AK 228 is a special purpose key providing platform authentication based on TPM attestation capabilities. The at least one TPM 108 of FIG. 1 may include some or all of the components of the at least one TPM 208 illustrated in FIG. 2.

At manufacturing TPM provisioning time (e.g., card manufacturing test or initial system genesis boot), process or host code is executed to use TPM facilities to create the primary attestation signing key (AK) 228. The process or host code may, for example, make use of a TPM provisioning process that includes attestation key enrollment at manufacturing TPM provisioning time. Attestation key enrollment at manufacturing TPM provisioning time for generating the primary AK 228 is substantially identical to attestation key enrollment for generating an attestation key (AK) for the purpose of signing a quote, discussed above. Network connection (e.g., a connection to the Internet) to a trusted certificate authority (CA) enables creation of a provisioned node AK certificate 226. The provisioned node AK certificate 226 and, optionally, the primary AK 228 itself, once verified, are written to non-volatile (NV) memory space (e.g., NVRAM 220) of the TPM 208 used to create the primary AK 228.

The PNOR flash memory 210 may be used to store firmware images 230, including Hostboot code 232. In accordance with one or more embodiments, all firmware, including Hostboot code 232, is stored in and loaded from the PNOR flash memory 210. The PNOR flash memory 210 may be connected to the master processor (and alternate master processor) through a serial peripheral interface (SPI) bus (not shown). In addition, the alternate master processor may have an alternate PNOR flash memory, so that the PNOR flash memory 210 is also not a single point of failure.

Hostboot code 232 is firmware that runs on the host processors to initialize the memory and processor bus during initial program load (IPL). For example, Hostboot firmware performs memory initialization and other tasks in IBM® POWER® based systems. IBM® and POWER® are registered trademarks of International Business Machines Corporation ("IBM") in the United States. Hostboot code 232 may include various conventional components such as initial Hostboot base (HBB) code 234 and Hostboot extended (HBI) code 236. Hostboot code 232, in accordance with one or more embodiments, runs during IPL to initialize processors and memory and buses, and actually goes away before hypervisors and OSs run. A component of Hostboot firmware distinct from Hostboot code 232, known as Hostboot Runtime Services, provides runtime services. Also, in accordance with one or more embodiments, Hostboot code 232 may include multi-node merge code 238 that implements an authentication protocol for merging multiple compute nodes (e.g., compute nodes 102a-n in FIG. 1) with multiple TPMs 208 utilizing the provisioned node AK certificates 226. Hostboot code 110 of FIG. 1 may include some or all of the components of Hostboot code 232 illustrated in FIG. 2.

The self boot engine (SBE) 212 is part of the power on reset engine (PORE) that is used for initializing the processor chip to run Hostboot procedures. A PORE is a processor engine that initializes various other hardware entities using a simple instruction image. The SBE 212 may, for example, reside in and load from the host POWER8® master processor's on-chip one-time programmable read only memory (OTPROM). POWER8® is a registered trademark International Business Machines Corporation ("IBM") in the United States. Because SBE 212 resides in the OTPROM, it is immutable and cannot be overwritten by an attacker.

The OTPROM code provides an entry point to another executable SBE image stored in a serial electrically erasable programmable read only memory (SEEPROM) located on the POWER8® processor module. This SBE now begins loading additional executable images from the processor NOR (PNOR) flash memory 210. The first component to be loaded is the Hostboot code 232. The Hostboot code 232 is the first firmware component capable of performing an extend operation to the TPM 208, and Trusted Boot measurements start there.

In accordance with one or more embodiments, a trusted processor register may be used to direct communications (i.e., node-to-node messages) between the multi-node merge code 238 (or other part of Hostboot code 232) on the master compute node and the multi-node merge code 238 (or other part of Hostboot code 232) on each slave compute node. A non-limiting example of a trusted processor register is a trusted "A-Bus" Mailbox Register, which is an on-chip processor register of the processor(s) 204, that provides direct physical wires between like-positioned processors on respective compute nodes (through the secure trusted communications channel (113 in FIG. 1 and "Secure Channel" in FIG. 3, described below)) providing bi-directional 8-byte data transfers.

Each of the processor(s) 204, in accordance with one or more embodiments, includes at least one on-chip trusted processor register shown as "A-Bus" Mailbox Register 270. The multi-node merge code 238 (or other part of Hostboot code 232) on the master compute node may selectively configure the trusted "A-Bus" Mailbox Register 270 on the master compute node to direct a node-to-node message (e.g., a Quote Request, described below) from the multi-node merge code 238 (or other part of Hostboot code 232) on the master compute node to the multi-node merge code 238 (or other part of Hostboot code 232) on a particular one of the slave compute node(s). The multi-node merge code 238 (or other part of Hostboot code 232) on each slave compute node may selectively configure the trusted "A-Bus" Mailbox Register 270 on that slave compute node to direct a node-to-node message (e.g., a Quote Response, described below) from the multi-node merge code 238 (or other part of Hostboot code 232) on that slave compute node to the multi-node merge code 238 (or other part of Hostboot code 232) on the master compute node.

The firmware stack 214 may include, for example, a Core Root of Trust for Measurement (CRTM) 242, HB extended functions (HBI) 244, multi-node merge functions 246, and POWER Hypervisor™ (PHYP) 248. POWER Hypervisor™ is a trademark/common law mark of International Business Machines Corporation ("IBM") in the United States. In accordance with one or more embodiments, multi-node merge code 238 is run on core processors (along with the other components of Hostboot code 232) to provide the multi-node merge functions 246 in the firmware stack 214. While booting, in accordance with one or more embodiments, there is a like instance of Hostboot on each compute node. Once the inter-node buses are trained and a single memory space is established, a single instance of PHYP is loaded which serves all the compute nodes. The like instance of Hostboot on each compute node goes away once PHYP is given control. The components of the firmware stack 214 illustrated in FIG. 2 are illustrative, and not limiting.

To create the Core Root of Trust for Measurement (CRTM) 242, in accordance with one or more embodiments, a Secure Boot feature is used that adds cryptographic checks in each phase of the IPL process until communication with the TPM is established. Secure Boot ensures the integrity of all firmware that must be run on core processors, thus preventing any unauthorized or maliciously modified firmware from running. A failure to authenticate the code at any point prevents the IPL process from reaching its completion. For example, in the multi-node system 100 of FIG. 1, each compute node 102a-n in which such a failure occurs will not send "an IPL compete" message to the FSP 116 (e.g., at operation 410 of FIG. 4, described below).

Figure 3:
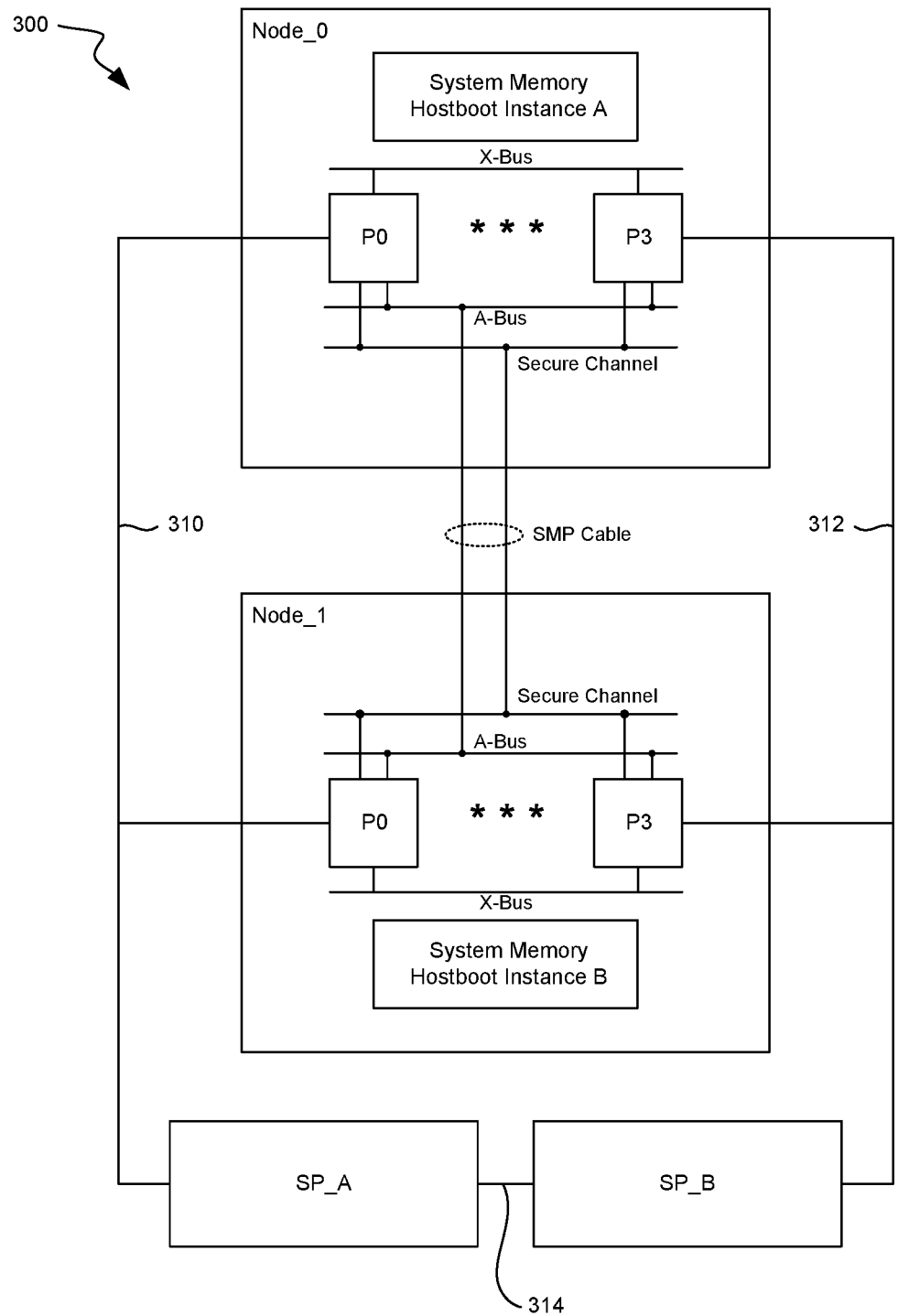
FIG. 3 is a block diagram of two compute nodes forming a single multi-node system, in accordance with one or more embodiments.

FIG. 3 is a block diagram of two compute nodes (i.e., Node_0 and Node_1) forming a single multi-node system 300, in accordance with one or more embodiments. Each of these compute nodes includes four processors (P0, P1, P2, and P3), of which only two processors (i.e., P0 and P3) are shown in FIG. 3 for the sake of clarity. The processors within each compute node illustrated in FIG. 3 are connected by multiple sets of buses, such as an X-Bus and an A-Bus. The X-Bus connects the processors to each other locally within each compute node. The A-Bus, on the other hand, connects the processors within each compute node to each other and to the processors within the other compute node via one or more SMP cables. SMP cables are direct processor chip connections. Multiple sets of buses, including the A-Bus, may be connected by one or more SMP cables.

In accordance with one or more embodiments, the secure channel may comprise an SMP cable directly connected between like-positioned processor chips. For example, the secure channel may be a small portion of the SMP cable (e.g., one or two wires of the SMP cable). In accordance with one or more embodiments, the secure channel may be one or more direct physical wires between like-positioned processors on the respective compute nodes configured to provide bi-directional 8-byte data transfers. The A-Bus may be controlled by one or more processor registers (e.g., "A-Bus Mailbox Register(s)" 270 in FIG. 2). "A-Bus Mailbox Registers" are on-processor registers connected between the compute nodes by SMP cables. The secure channel is trusted because the A-Bus is hardwired on the processor chips of the compute nodes and the SMP cables are directly connected thereto (i.e., direct processor chip connections).

As illustrated in FIG. 3, the compute nodes may each comprise an instance of Hostboot loaded into system memory shared by the compute nodes.

As also illustrated in FIG. 3, two service processors (i.e., SP_A and SP_B) may be connected to the compute nodes using two communication buses 310, 312, respectively. One service processor (e.g., SP_A) may be a primary service processor, and the other service processor (e.g., SP_B) may be a backup service processor. The primary service processor may utilize one of the communication buses (e.g., 310). The backup service processor may utilize the other one of the communication buses (e.g., 312). The service processors SP_A, SP_B may communicate with each other using a connection 314.

One or more components of the multi-node system 100 illustrated in FIG. 1 may correspond with one or more components of the multi-node system 300 of FIG. 3. For example, the secure trusted communications channel 113 of the multi-node system 100 illustrated in FIG. 1 may correspond with the secure channel of the multi-node system 300 of FIG. 3. Likewise, one or more components of the compute node 202 illustrated in FIG. 2 may correspond with one or more components of the compute nodes (i.e., Node_0 and Node_1) of FIG. 3. For example, the memory 206 of the compute node 202 illustrated in FIG. 2 may correspond with system memory shared by the compute nodes of FIG. 3.

An authentication protocol for merging multiple compute nodes with multiple trusted platform modules (TPMs) utilizing provisioned node certificates, in accordance with one or more embodiments, is discussed below with reference to FIGS. 4 and 5.

Figure 4:
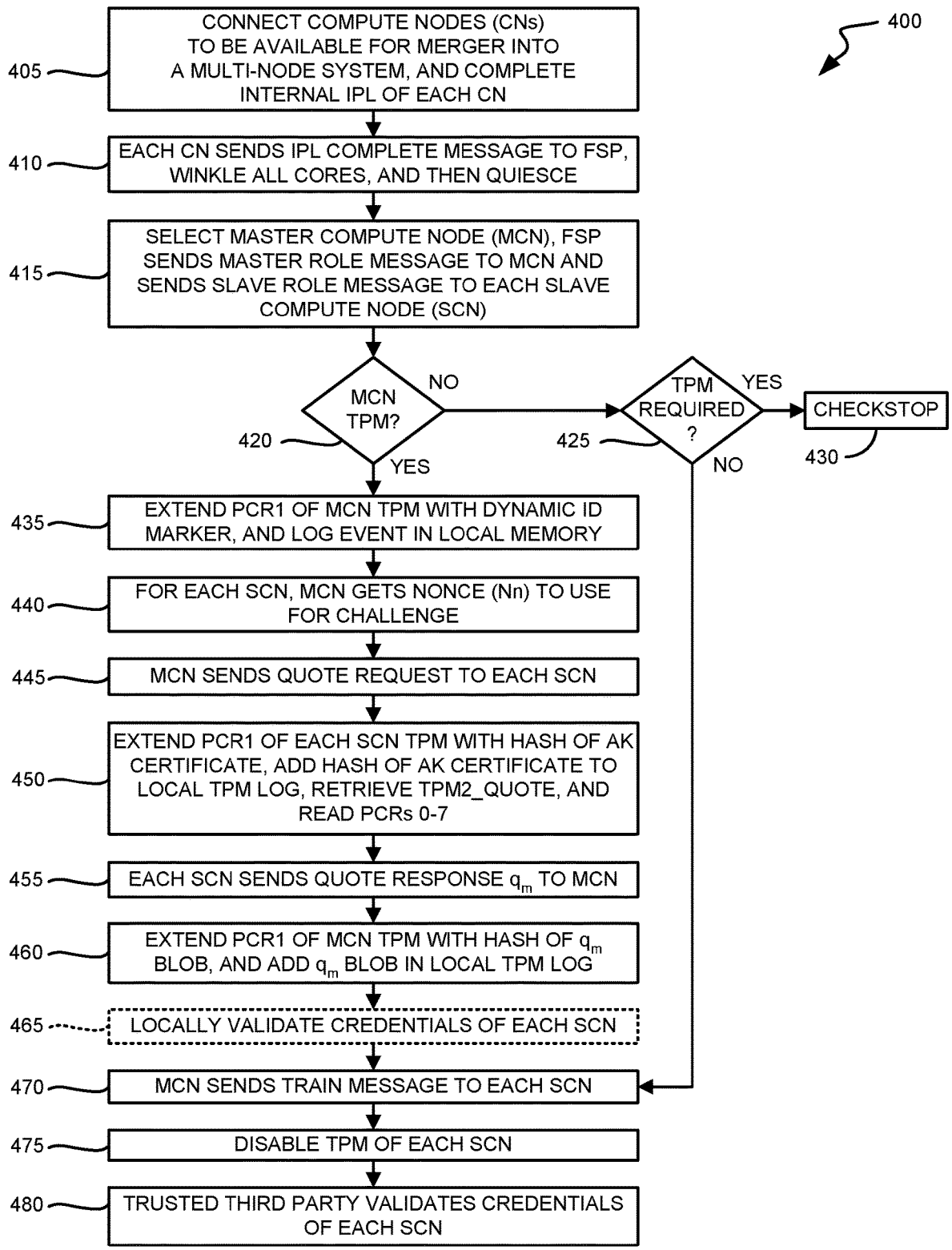
FIG. 4 is a flow diagram of an illustrative process for merging multiple compute nodes with trusted platform modules utilizing provisioned node certificates, in accordance with one or more embodiments.

FIG. 4 is a flow diagram of an illustrative process 400 for merging multiple compute nodes with trusted platform modules utilizing provisioned node certificates, in accordance with one or more embodiments. The process 400 of FIG. 4 includes operations 405-480, of which operations 435-480 constitute an authentication protocol for merging multiple compute nodes with trusted modules utilizing provisioned node certificates, in accordance with one or more embodiments.

Figure 5:
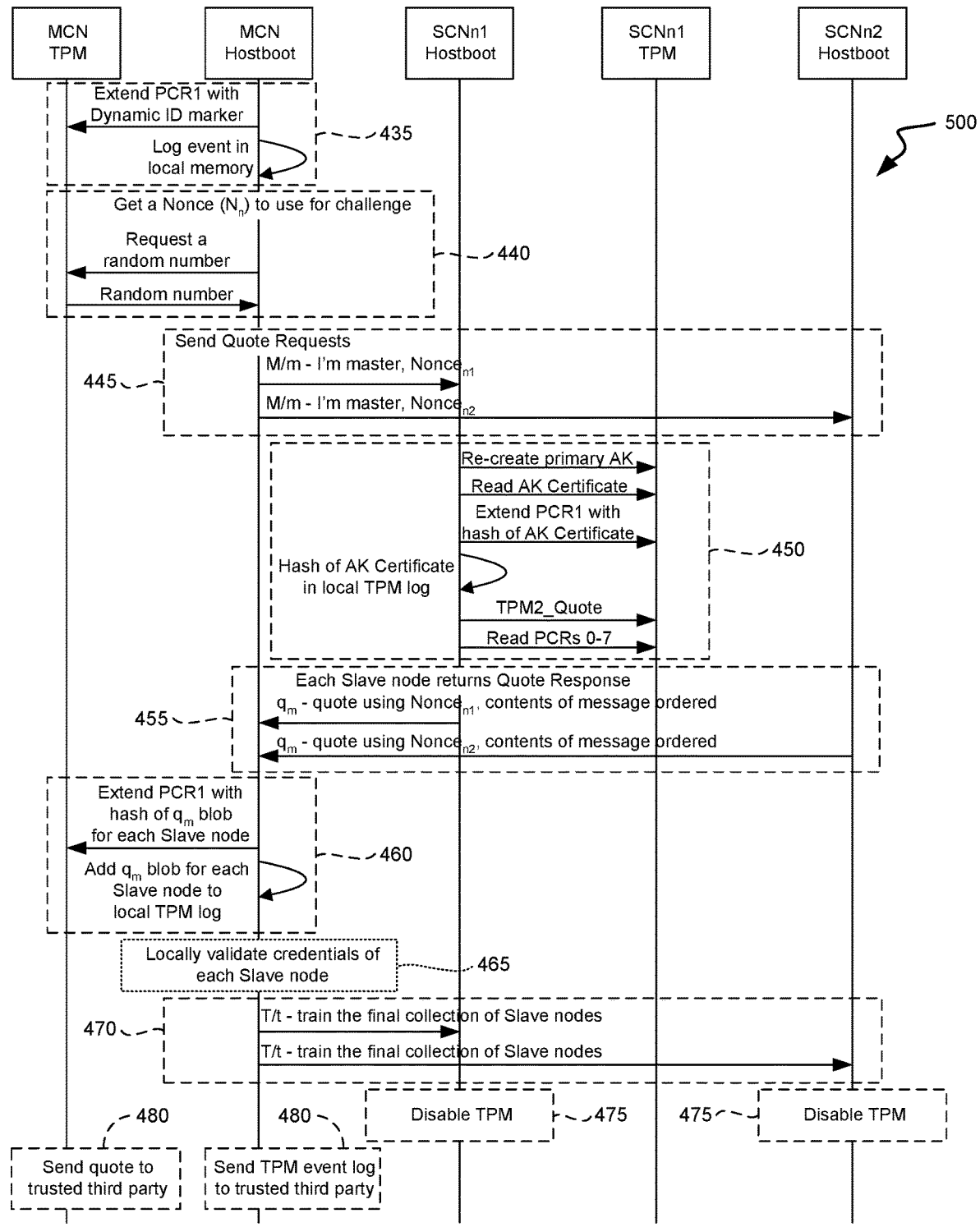
FIG. 5 is a communication flow diagram illustrating message traffic utilized in an authentication protocol for merging multiple compute nodes with multiple trusted platform modules utilizing provisioned node certificates, in accordance with one or more embodiments.

FIG. 5 is a communication flow diagram illustrating message traffic employed in an authentication protocol 500 for merging multiple compute nodes with multiple trusted platform modules utilizing provisioned node certificates, in accordance with one or more embodiments. The message traffic illustrated in FIG. 5 is presented as operations 435-480, which correspond to operations 435-480 of FIG. 4. As illustrated in FIG. 5, the authentication protocol establishes a quote request/response flow between an assigned master compute node and all slave compute nodes that participate in the merge process.

In FIG. 5, Hostboot code on the assigned master compute node is denoted as "MCN Hostboot", Hostboot code on a first slave compute node is denoted as "SCNn1 Hostboot", Hostboot code on a second slave compute node is denoted as "SCNn2 Hostboot", a trusted platform module (TPM) on the master compute node is denoted as "MCN TPM", and a TPM on the first slave compute node is denoted as "SCNn1 TPM". FIG. 5 illustrates messages between Hostboot code on the master compute node and a TPM on the master compute node (i.e., messages between "MCN Hostboot and "MCN TPM"), node-to-node messages between Hostboot code on the master compute node and Hostboot code on one or more slave compute nodes (e.g., node-to-node messages between "MCN Hostboot" and "SCNn1 Hostboot", as well as node-to-node messages between "MCN Hostboot" and "SCNn2 Hostboot"), and messages between Hostboot code on each slave compute node and a TPM on each slave compute node (e.g., messages between "SCNn1 Hostboot" and "SCNn1 TPM"), in accordance with one or more embodiments.

Referring now to FIG. 4, the process 400 begins by connecting a plurality of compute nodes so as to be available for merger into a single multi-node system and with each compute node completing its own (i.e., internal) initial program load (IPL) (operation 405).

In operation 405, multiple compute nodes (e.g., 102a-n in FIG. 1) are connected so as to be available for merger into a single multi-node system. For example, the compute nodes may be connected together via a scalability connection (e.g., 112 in FIG. 1) and a secure trusted communications channel (e.g., 113 in FIG. 1), and connected to a flexible service processor (FSP) (e.g., 116 in FIG. 1) via a communication bus (e.g., 118 in FIG. 1).

In accordance with one or more embodiments, in each compute node, Hostboot (e.g., 232 in FIG. 2, including HBB code 234, HB extended code 236, and multi-node merge code 238) is loaded by a self boot engine (SBE) (e.g., 212 in FIG. 2) after the SBE completes its own initialization tasks (e.g., the SBE may initialize the POWER® cores). POWER® is a registered trademark of International Business Machines Corporation ("IBM") in the United States. Hostboot is the first component of the firmware stack (e.g., 214 in FIG. 2) that executes on the POWER cores, for example.

In operation 405, the master compute node does not yet know it is the master compute node. Also, in operation 405, the processor core on the master compute node is activated and Hostboot is running from real memory (not cache). In operation 405, Hostboot code on the master compute node completes the master compute node's own internal IPL and sets the "IPL complete" internal state on the master compute node.

In general, TPMs have multiple Platform Configuration Registers (PCRs) which are referred to herein as PCR0, PCR1, etc. through PCRj. PCRs are discussed in Trusted Computing Group (TCG) specifications, which are publicly available.

At the master compute node TPM, in operation 405, the following are stored: initial measurements for PCR0, PCR1, PCR4, and PCR6 (PCRs 222 in FIG. 2). Also in operation 405, at the master compute node TPM, the following are stored from manufacturing: node add key blob (the primary AK 228 in FIG. 2); and node add certificate (the provisioned node AK certificate 226 in FIG. 2).

In operation 405, each slave compute node does not yet know it is a slave compute node. Also, in operation 405, the processor core in each slave compute node is activated and Hostboot is running from real memory (not cache). In operation 405, Hostboot code on each slave compute node completes the slave compute node's own internal IPL and sets the "IPL complete" internal state in the slave compute node.

At each slave compute node TPM, in operation 405, the following are stored: initial measurements for PCR0, PCR1, PCR4, and PCR6 (PCRs 222 in FIG. 2). Also in operation 405, at each slave compute node TPM, the following are stored from manufacturing: node add key blob (the primary AK 228 in FIG. 2); and node add certificate (the provisioned node AK certificate 226 in FIG. 2).

In operation 405, the FSP (116 in FIG. 1) waits to receive an IPL complete message from each compute node.

The method 400 continues with each compute node (e.g., the master compute node and each slave compute node) sending an IPL complete message to the flexible service processor (FSP) (operation 410). Also, in operation 410, all the processor cores of each compute node are placed in the Winkle state, and then each compute node moves into the Quiesced state. The Winkle state is a very-low power state for a processor core where most of the processor core (and surrounding logic) is shut off. When a compute node is in Quiesced state, the compute node cannot accept system deployments.

The method 400 continues, upon the FSP receiving the IPL complete message from each compute node (in operation 410), by sending a master role message to the master compute node and a slave role message to each slave compute node (operation 415). At multi-node merge time, the FSP has assigned master/slave roles to participating compute nodes. The master role message sent to the master compute node may, for example, contain the following information: Your role is master; Your node number; TPM_Required setting; List of other compute nodes; and Type of IPL (cold, MPIPL). The slave role message sent to each slave compute node may, for example, contain the following information: Your role is slave; Your node number; TPM_Required setting; List of other compute nodes; and Type of IPL (cold, MPIPL).

In operation 415, these FSP-to-node messages (i.e., the master role message and the slave role messages) may be sent, for example, via a communication bus (e.g., 118 in FIG. 1). Hostboot code on the master compute node may save the master role message received from the FSP in local memory (e.g., the master role message (or portions thereof) received by the master compute node from the FSP may be saved in an information field denoted as "role message 252" in memory 206 in FIG. 2) in operation 415. Hostboot code on each slave compute node may save the slave role message received from the FSP in local memory (e.g., the slave role message (or portions thereof) received by each respective one of the slave compute nodes from the FSP may be saved in an information field denoted as "role message 252" in memory 206 in FIG. 2) in operation 415.

The method 400 continues with Hostboot code on the master compute node determining whether a properly functioning TPM is present on the master compute node (operation 420). In operation 420, if Hostboot code on the master compute node determines that no properly functioning TPM is present on the master compute node (operation 420=NO), method 400 continues with Hostboot code on the master compute node determining whether a TPM is required (operation 425). In accordance with one or more embodiments, this determination in operation 425 is utilized to accommodate an administrator controllable setting (e.g., TPM_Required setting) for debug environments. For example, Hostboot code on the master compute node may access local memory (e.g., memory 206 in FIG. 2) to check the TPM_Required setting in the master role message received from the FSP in operation 415.

In operation 425, if Hostboot code on the master compute node determines that a TPM is required (operation 425=YES), the method 400 ends with Hostboot code on the master compute node triggering a checkstop (operation 430). A checkstop is a fatal error that is typically handled immediately or as quickly as possible. The checkstop triggered in operation 430 may be handled, for example, by freezing all processor states on the master compute node. In addition, in accordance with one or more embodiments, the checkstop triggered in operation 430 may further trigger a subsequent waking of each slave compute node. On the other hand, in operation 425, if Hostboot code on the master compute node determines that a TPM is not required (operation 425=NO) (e.g., in a debug environment), the method 400 continues with Hostboot code on the master compute node sending a "Train" message to each slave compute node (operation 470, discussed below).

In method 400, all node-to-node messages such as the Train message mentioned above may be sent, for example, via the trusted "A-Bus" Mailbox Registers. In accordance with one or more embodiments, the physical cabling and hardware capabilities of the system (e.g., multi-node system 100 in FIG. 1 and multi-node system 300 in FIG. 3) are such as to provide a secure trusted communications channel (e.g., 113 in FIG. 1 and "Secure Channel" in FIG. 3) between the compute nodes to be merged (e.g., the compute nodes 102a-n in FIG. 1 and compute nodes Node_0, Node_1 in FIG. 3). The secure trusted communications channel may be used for host firmware message passing to support the authentication protocol, in accordance with one or more embodiments to the present invention.

If Hostboot code on the master compute node determines in operation 420 that a properly functioning TPM is present on the master compute node (operation 420=YES), the method 400 continues with Hostboot code on the master compute node extending PCR1 of the master compute node's TPM with a Dynamic ID marker, and logging the event in local memory (operation 435). For example, in operation 435, Hostboot code on the master compute node may log the event in a TPM event log (e.g., 256 in FIG. 2) on the master compute node and in local memory (e.g., the Dynamic ID marker may be saved in an information field denoted as "Dynamic ID marker 254" in memory 206 in FIG. 2) on the master compute node.

In general, a PCR extend operation is performed on one or more of the PCRs of a TPM to update the register value to record the history of messages that are extended to the register. Rather than performing a write operation directly on a PCR, the PCR extend operation takes the original value in the PCR, concatenates the new message to it, and takes a hash to produce an updated register value. The history of messages that are extended and the order of extends can be compared later with corresponding TPM event logs.

Also, when a TPM PCR extend operation is performed, a TPM event log entry is recorded in a TPM event log (e.g., 256 in FIG. 2). The TPM event log may be used by external entities that depend on remote attestation and by host firmware during multi-node synchronization. The TPM event logs are used to reconstruct and validate PCR values against known values. The TPM event logs are not maintained by the TPM. Thus, the firmware must provide storage for the TPM event logs and provide interfaces to update the TPM event logs on PCR extends and access the TPM event logs for attestation purposes.

The method 400 continues with Hostboot code on the master compute node getting a nonce (Nonce$_n$) for each slave compute node to use for challenge (operation 440). A nonce is a random number used only once in a cryptographic communication. For example, Hostboot code on the master compute node, for use relative to each respective slave compute node, may request a random number from the TPM on the master compute node. In response to the request, the TPM on the master compute node, generates a random number for use relative to each respective slave compute node and sends each respective random number to Hostboot code on the master compute node. In operation 440, Hostboot code on the master compute node may save the random number(s) received from the TPM on the master compute node in local memory (e.g., the random numbers—each associated with a respective one of the slave compute nodes—may be saved in an information field denoted as "Nonce(s) 258" in memory 206 in FIG. 2) on the master compute node.

The method 400 continues with the master compute node initiating a quote process with respect to each slave compute node by sending a quote request (denoted as "M/m—I am master, Nonce$_{n1}$" and "M/m—I am master, Nonce$_{n2}$" in FIG. 5) to each slave compute node across the secure trusted communications channel (operation 445). Sending the quote request may be controlled by Hostboot code on the master compute node. For example, Hostboot code on the master compute node ("MCN Hostboot" in FIG. 5) may send a quote request (i.e., "I am master" message) to Hostboot code on each slave compute node ("SCNn1 Hostboot" and "SCNn2 Hostboot" in FIG. 5) that includes the nonce associated with the slave compute node (for freshness), as well as the specific PCR contents requested from the slave compute node's TPM. Hostboot code on each slave compute node may save the "I am master" message received from the master compute node in local memory. For example, in operation 445, the "I am master" message (or portions thereof, such as the Nonce) received by each respective one of the slave compute nodes from the master compute node may be saved in an information field denoted as "quote request 260" (or the Nonce may be saved in an information field denoted as "Nonce(s) 258") in memory 206 in FIG. 2.

In FIG. 5, nested in the "n" node-to-node messages (e.g., the "I'm master" message sent to SCNn1 Hostboot, the "I'm master" message sent to SCNn2 Hostboot, etc.), the message content may have its own message type and (payload) as follows:

M: I am master, TPM is NOT required (nonce);
m: I am master, TPM is required (nonce);
q: quote response (certificate, log, quote);
T: train the bus, mark all TPMs as lost, open up all the links( ); and
t: train the bus, open up only links with good TPMs( ).

For example, in FIG. 5, with regard to the "I am master" message, the identifier "M" denotes a message type for the quote request where TPM is NOT required; whereas, the identifier "m" denotes a message type for the quote request where TPM is required.

In response to each slave compute node receiving the "I am master" message from the master compute node in operation 445, the method 400 continues with Hostboot code on each slave compute node requesting the slave compute node's TPM to re-create the primary attestation signing key (AK) (i.e., in embodiments where the primary AK was not originally stored in the slave compute node's TPM to save TPM NVRAM space), reading the AK certificate, extending the PCR1 of the slave compute node's TPM with a hash of the AK certificate, and adding the hash of the AK certificate to the local TPM event log (operation 450). In other embodiments where the primary attestation signing key (AK) was originally stored in each slave compute node's TPM (e.g., the primary AK may have been saved at manufacturing TPM provisioning time in an information field denoted as "AK 228" in NVRAM 220 of the slave compute node's TPM 208 in FIG. 2), Hostboot code on each slave compute node requests the slave compute node's TPM to read the primary AK in operation 450, rather than re-create the primary AK. Extending the PCR1 (system configuration) of the slave compute node's TPM with the hash of the AK certificate, as well as adding the hash of the AK certificate to the slave compute node's TPM event log, serves to lock in the slave state locally (i.e., in the slave compute node). Also, in operation 450, Hostboot code on the slave compute node may also save the hash of the AK certificate in local memory (e.g., the hash of the AK certificate may be saved in an information field denoted as "hash of AK certificate 262" in memory 206 in FIG. 2).

In addition, in operation 450, after locking in the slave state locally earlier in operation 450 as described above, Hostboot code on the slave compute node retrieves a signed quote from the slave compute node's TPM. In operation 450, Hostboot code on each slave compute node may, for example, send a tpm2_quote command to the slave compute node's TPM, along with a list of selected PCRs (e.g., PCR0-7). The tpm2_quote command instructs the slave compute node's TPM to provide a quote and signature for the given list of PCRs. The quote is signed by the primary AK of the slave compute node's TPM.

The method 400 continues with each slave compute node sending a quote response to the master compute node across the secure trusted communications channel (operation 455). Sending the quote response may be controlled by Hostboot code on each slave compute node. For example, Hostboot code on each slave compute node may return a quote response to Hostboot code on the master compute node as a structured message containing the slave compute node ID, the Nonce from the master compute node, TPM quote data (as defined by Trusted Computing Group's TPM specification), the TPM quote signature (the data having been signed by the primary AK of the slave compute node's TPM), the contents of PCR0-7, the AK certificate of the slave compute node's TPM, and the slave compute node's TPM event log. Each slave compute node sends a quote response to the master compute node. For example, in FIG. 5, Hostboot code on the slave compute node n1 ("SCNn1 Hostboot" in FIG. 5) sends the quote response in the form of a "$q_m$ blob" message ("$q_m$—quote using Nonce$_{n1}$, contents of message ordered" in FIG. 5) to Hostboot code on the master compute node ("MCN Hostboot" in FIG. 5), and Hostboot code on the slave compute node n2 ("SCNn2 Hostboot" in FIG. 5) sends a quote response in the form of a "$q_m$ blob" message ("$q_m$—quote using Nonce$_{n2}$, contents of message ordered" in FIG. 5) to Hostboot code on the master compute node ("MCN Hostboot" in FIG. 5). In FIG. 5, the subscript "m" in the "$q_m$ blob" message denotes a message type for the quote response where TPM is required. The "$q_m$ blob" message is ordered as follows:

Node ID;
Nonce from Master;
Quote;
Signature;
PCR0-7;
AK certificate; and
TPM Log.

In response to Hostboot code on the master compute node receiving the "$q_m$ blob" from each slave compute node in operation 455, the method 400 continues with Hostboot code on the master compute node extending a hash of the "$q_m$ blob" message to the master compute node's TPM(s) PCR1 and adding the entire "$q_m$ blob" message (not hash of) to the master compute node's TPM event log (operation 460). Also, in operation 460, Hostboot code on the master compute node may save the "$q_m$ blob" message received from each slave compute node in local memory (e.g., the "$q_m$ blob" message (or portions thereof) received from each respective one of the slave compute nodes may be saved in an information field denoted as "quote response(s) 264" in memory 206 in FIG. 2).

In accordance with one or more embodiments, as illustrated in FIGS. 4 and 5, host firmware on the master compute node may at this time locally validate the credentials of each slave compute node (operation 465) prior to enabling node merge operations. Operation 465, as denoted by the dotted lines in FIGS. 4 and 5, is discretionary. Local validation by Hostboot (and/or other host firmware) at this point is preferred, but depends on the host firmware having a sufficiently high level validation code.

As illustrated in FIGS. 4 and 5, Hostboot (and/or other host firmware) on the master compute node may be charged with performing this discretionary confirmation of slave compute node authenticity prior to training the final collection of nodes (operation 470, described below). One skilled in the art will appreciate, however, this discretionary confirmation of slave compute node authenticity may be performed by Hostboot (and/or other host firmware) on the master compute node any time before completion of node merge operations.

For example, Hostboot (and/or other host firmware) on the master compute node in operation 465 may validate the credentials of each slave compute node by analyzing (at least cursorily) the "$q_m$ blob" message received from each slave compute node for any prohibited level of firmware and/or for an authentic AK certificate (e.g., the AK certificate at least tracks back to a trusted CA), or by utilizing other well-known authentication techniques to analyze the "$q_m$ blob" message received from each slave compute node.

In accordance with one or more other embodiments, the host firmware on the master compute node may defer to a trusted third party to perform validation after completion of node merge operations but prior to trusting the system to secure workloads (operation 480, discussed below). The necessary information may be subsequently provided (i.e., after completion of node merge operations but prior to trusting the system to secure workloads) to a trusted third party via what is a well-known remote attestation process to enable the third party to confirm authenticity of the slave compute nodes.

A final node-to-node message (i.e., a "Train" message, described below) in the authentication protocol, in accordance with one or more embodiments, is sent (operation 470, described below) to each slave compute node at the end of the quote process to disable (operation 475, described below) the slave compute node TPMs (all future interactions are with the master compute node TPM(s) only) and to trigger completion of the node merge operations that enable processor bus communications for full system connectivity.

The method 400 continues with the master compute node sending a "Train" message to each slave compute node across the secure trusted communications channel (operation 470). Sending the "Train" message may be controlled by Hostboot on the master compute node. For example, Hostboot code on the master compute node ("MCN Hostboot" in FIG. 5) may send the "Train" message to Hostboot code on each slave compute node ("SCNn1 Hostboot" and "SCNn2 Hostboot" in FIG. 5) to train the final collection of nodes. For example, in FIG. 5, T/t—"train the final collection of nodes" is sent to slave compute node n1 ("SCNn1 Hostboot" in FIG. 5), and T/t—"train the final collection of nodes" is sent to slave compute node n2 ("SCNn2 Hostboot" in FIG. 5). In FIG. 5, the identifier "T" denotes a message type for the "Train" message where TPM is NOT required (T: train the bus, mark all TPMs as lost, open up all the links( )). Also, in FIG. 5, the identifier "t" denotes a message type for the "Train" message where TPM is required (t: train the bus, open only links with good TPMs( )).

The method 400 continues with Hostboot code on each slave compute node disabling the slave compute node's TPM(s) (operation 475). Hostboot code on each slave compute node ("SCNn1 Hostboot" and "SCNn2 Hostboot in FIG. 5) may disable the slave compute node's TPM(s) by, for example, "poisoning" the slave compute node's registers (e.g., extending random numbers to all the PCRs of the slave compute node's TPM(s) and not logging the event to the TPM event logs—accordingly, attestation will never validate against the TPM event logs or other published values).

As noted above, in accordance with one or more other embodiments, the host firmware on the master compute node may defer to a trusted third party to perform validation after completion of node merge operations but prior to trusting the system to secure workloads (operation 480). The necessary information may be subsequently provided (i.e., after completion of node merge operations but prior to trusting the system to secure workloads) to a trusted third party via what is a well-known remote attestation process to enable the third party to confirm authenticity of the slave compute nodes.

In one example, in operation 480, after the node merge operations are completed (but before the multi-node system is trusted to secure workloads), an attestation server may confirm the authenticity of the slave compute nodes (as well as the authenticity of the master compute node) via the remote attestation process. The process of retrieving and analyzing a quote is known as remote attestation, discussed earlier. Remote attestation is a client/server process. In the process of remote attestation, an attestation server retrieves a quote from a client TPM. In this case, the client TPM is the master compute node's TPM. In operation 480, as shown in FIG. 5, the master compute node's TPM may send a quote to an attestation server (in response to the master compute node's TPM having received a request for a quote from an attestation server).

In the process of remote attestation, the attestation server also retrieves the TPM event log from the client. In operation 480, as shown in FIG. 5, Hostboot code (but more likely hypervisor firmware and/or other host firmware since this operation would typically occur after IPL and Hostboot code has gone away) on the master compute node may send the TPM event log to the attestation server (in response to host firmware on the master compute node having received a request for the TPM event log from the attestation server). Additional data (e.g., the "$q_m$ blob" message received by the master compute node from each slave compute node and cached on the master compute node's local memory) may also be sent by host firmware on the master compute node to the attestation server (e.g., in response to host firmware on the master compute node having received a request for such additional data from the attestation server).

Before a quote and the TPM event log (and, possibly, additional data) can be sent to the attestation server, the client TPM (master compute node's TPM) must be enrolled at the attestation server. As discussed earlier, during enrollment, the attestation server verifies the client TPM (master compute node's TPM) Endorsement Key (EK) against the root EK from the TPM manufacturer, and presents a challenge to the client TPM (master compute node's TPM) that can only be completed if the client TPM (master compute node's TPM) is the owner of the EK and a unique Attestation Key (AK) (i.e., the unique AK generated by the master compute node's TPM for the purpose of signing the quote). Once enrolled, the client TPM (master compute node's TPM) can send a quote to the attestation server in response to receiving a request for a quote. Likewise, host firmware on the master compute node can send the TPM event log (and, possibly, additional data) in response to receiving a request for the TPM event log (and, possibly, a request for such additional information).

In response to receiving the quote from the client TPM (master compute node's TPM) and the TPM event log (and, possibly, additional data) from host firmware on the master compute node, the attestation server may verify the integrity of the of the quote using a secure hash of all PCR values, verify the signature over the quote against the master compute node's TPM AK (i.e., the unique AK generated by the master compute node's TPM for the purpose of signing the quote), verify the TPM event log (to which the TPM event log of each slave compute node's TPM was added in operation 460) by replaying the measurements and comparing the calculated PCR values to those in the quote, and/or by utilizing other well-known authentication techniques to analyze the "$q_m$ blob" message received by the master compute node from each slave compute node. As discussed above, the "$q_m$ blob" message received by the master compute node from each slave compute node is added in operation 460 to the master compute node's local TPM event log (256 in FIG. 2) and cached in the master compute node's local memory (264 in FIG. 2).

In accordance with one or more embodiments, in response to receiving the quote from the client TPM (master compute node's TPM) and the TPM event log (and, possibly, additional data) from host firmware on the master compute node, the attestation server may determine whether the PCR values of the master compute node's TPM—the PCR1 of which was extended in operation 460 to reflect the $q_m$ blob message received from each slave compute node's TPM—on this boot are the same as: the last (i.e. the previous time the multi-node system booted and the authenticity of the compute nodes was confirmed via remote attestation); a reference or "golden" state that was recorded earlier; and/or a published state. In accordance with one or more embodiments, in response to receiving the quote from the client TPM (master compute node's TPM) and the TPM event log (and, possibly, additional data) from host firmware on the master compute node, the attestation server may also analyze the "$q_m$ blob" message received by the master compute node from each slave compute node: against one or more lists of approved/prohibited firmware; and/or for an authentic AK certificate (e.g., the AK certificate at least tracks back to a trusted CA).

In another example, after the node merge operations are completed and a hypervisor is running on the multi-node system, the hypervisor may serve as the local attestation agent for remote third party confirmation of the authenticity of the slave compute nodes (and the master compute node) via the remote attestation process before the operating system(s) is/are loaded into system memory.

In yet another example, after the node merge operations are completed and the operating system(s) is/are running on the multi-node system, the operating system(s) in conjunction with the hypervisor may serve as the local attestation agent for remote third party confirmation of the authenticity of the slave compute nodes (and the master compute node) via the remote attestation process before the multi-node system is trusted to secure workloads.

Figure 6:
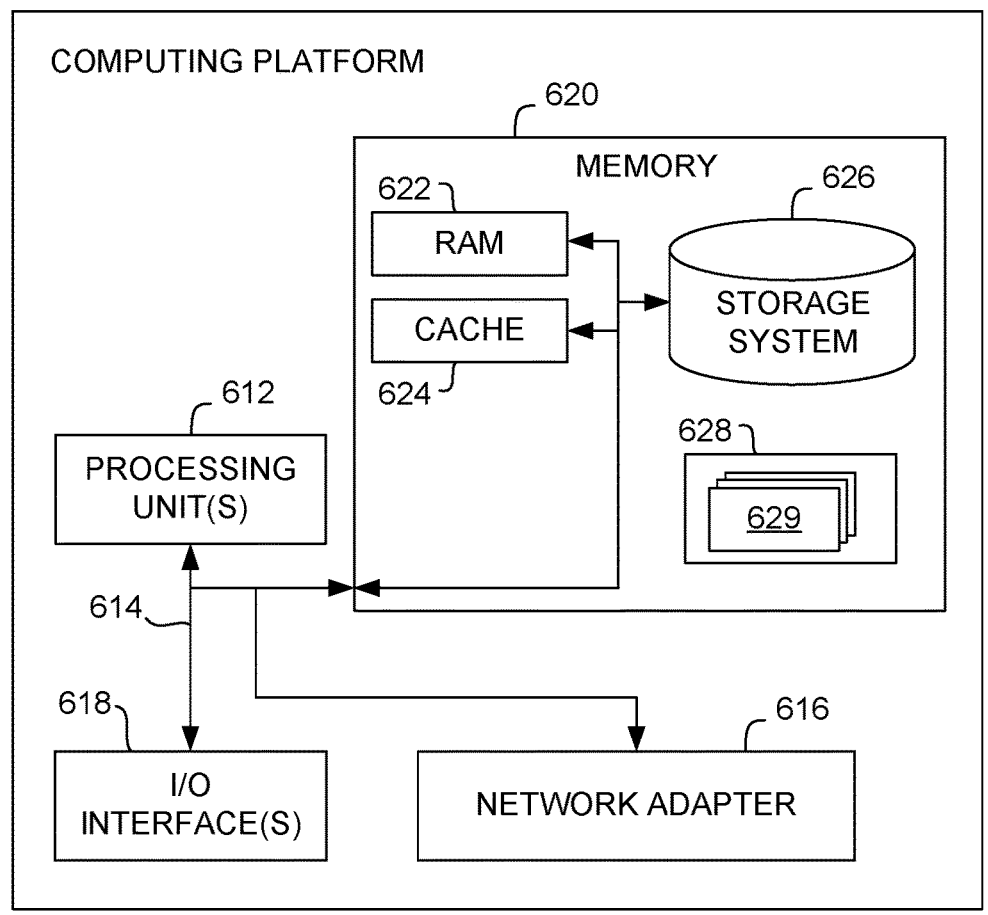
FIG. 6 is a block diagram of an example computing platform that may be suitable for practicing one or more embodiments.

FIG. 6 is a block diagram of an example computing platform 600 that may be suitable for practicing one or more embodiments (e.g., one or more embodiments discussed above with reference to the multi-node system 100 of FIG. 1 and/or one or more embodiments discussed above with reference to the multi-node system 300 of FIG. 3). In one or more embodiments, the computing platform 600 may be configured to provide one or more compute nodes (such as the compute nodes 102a-n in FIG. 1 and/or the compute nodes Node_0, Node_1 in FIG. 3), one or more service processors (such as the FSP 116 in FIG. 1 and/or the service processors SP_A, SP_B in FIG. 3), and/or one or more hardware management consoles (such as the HMC 120 in FIG. 1). In one or more embodiments, each of the compute nodes may include a computing platform such as the computing platform 600. Various elements of the computing platform 600 may be shared between multiple compute nodes or may be separate for different compute nodes. The computing platform 600 may include, or be part of, any number of computing systems, such as a server system.

The components of the computing platform 600 may include, but are not limited to, one or more processors or processing units 612, a system memory 620, and a bus 614 that couples various platform components including system memory 620 to the processing unit(s) 612. Each of the processing unit(s) 612 may include one or more processing cores or other processing devices. The bus 614 represents one or more of any of several types of bus structures, including a memory bus or memory controller, a peripheral bus, an accelerated graphics port, a processor or local bus using any of a variety of architectures. By way of example, and without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computing platform 600 typically includes a variety of computer readable media. Such media may be any available media that is accessible by the computing platform 600, and it includes both volatile and non-volatile media, as well as removable and non-removable media.

The system memory 620 can include computer readable media in the form of volatile memory, such as random access memory (RAM) 622 and/or cache memory 624. The computing platform 600 may further include other removable/non-removable, volatile/non-volatile computer system storage media. By way of example only, a storage system 626 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 614 by one or more data media interfaces. As will be further depicted and described below, the system memory 620 may include at least one computer program product having a set (e.g., at least one) of program modules that are configured to carry out the functions of one or more embodiments.

The program/utility 628, having a set (at least one) of program modules 629, may be stored in system memory 620 by way of example, and not limitation, as well as an operating system, one or more application programs, other program modules, and program data. Each of the operating system, one or more application programs, other program modules, and program data or some combination thereof, may include an implementation of a networking environment. The program modules 629 generally carry out the functions and/or methodologies of one or more embodiments as described herein.

The techniques and systems described herein may be used to provide trust-related operations to any suitable component of the computing platform 600 or combination of multiple computing platforms 600.

The system memory 620 may be employed to store a copy, at least temporarily, of programming instructions implementing any suitable methods disclosed herein (or portions thereof) when executed by the processing unit(s) 612, herein denoted as program modules 629. For example, in one or more embodiments, the computing platform 600 may implement one or more of the compute nodes 102*a-n* of FIG. 1 and/or one or more of the compute nodes Node_0, Node_1 of FIG. 3. In another example, in one or more embodiments, the computing platform 600 may implement the flexible service processor (FSP) 116 of FIG. 1 and/or one or more of the service processors SP_A, SP_B of FIG. 3. In some such embodiments, the system memory 620 may be employed to store, at least temporarily, a copy of programming instructions implementing the method 400 of FIG. 4 (or portions thereof).

The computing platform 600 may also communicate with one or more external devices, such as a keyboard, a pointing device, a display, or one or more other devices that enable a user to interact with the computing platform 600. The computing platform 600 may also include other devices, such as a network card or modem that enable the computing platform 600 to communicate with one or more other computing devices. Such communication can occur via Input/Output (I/O) interfaces 618. Still further, the computing platform 600 can communicate with one or more networks, such as a local area network (LAN), a general wide area network (WAN), and/or a public network (e.g., the Internet) via a network adapter 616. As depicted, the network adapter 616 communicates with other components of the computing platform 600 via the bus 614. It should be understood that although not shown, other hardware and/or software components could be used in conjunction with the computing platform 600. Examples include, but are not limited to, microcode, device drivers, redundant processing units, external disk drive arrays, RAID systems, tape drives, and data archival storage systems.

In various embodiments, one or more elements of the computing platform 600 illustrated in FIG. 6 may not be included, or additional components may be included. For example, in one or more embodiments in which the computing platform 600 is configured to implement the flexible service processor (FSP) 116 of FIG. 1, the computing platform 600 may not include I/O interface(s) 618. In one or more embodiments in which the computing platform 600 is configured to implement one or more of the compute node 102*a-n* of FIG. 1, the network adapter 616 may include an interface to the secure trusted communications channel 113 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. As noted above, FIGS. 1-5 describe embodiments of the present invention implemented in a multi-node system that utilizes the Secure Boot feature. For Secure Boot, the CRTM code is based on self boot engine/Hostboot (SBE/HB). One skilled in the art will appreciate, however, that aspects of the present invention may be utilized in conjunction with other root of trust for measurement (RTM) models, such as a static RTM model. In a static RTM model, the CRTM code, which is typically included in the basic input output system (BIOS), must be run first when the server or the physical hardware environment is powered on, or when the server or physical hardware environment is reset. POST BIOS code of each of the compute nodes is firmware that runs on the host processors to initialize the memory and processor bus during initial program load (IPL). For example, the BIOS firmware on each compute node in a multi-node system may include POST BIOS code that runs when the system has just been powered up or the reset button was pressed (also known as a "cold boot"). As used herein, "BIOS" may refer to an interface between an operating system and platform firmware, and may include Unified Extensible Firmware Interface (UEFI). Each compute node in a multi-node system may be initially in an unmerged state with a separate copy of BIOS running on each node. Without departing from the spirit and scope of the present invention, POST BIOS code may be adapted to include multi-node merge code that implements an authentication protocol (or portions thereof) for merging multiple compute nodes with multiple TPMs utilizing provisioned node AK certificates. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method comprising:
connecting compute nodes to be available for merger into a single multi-node system, wherein each of the compute nodes includes firmware and a trusted platform module (TPM) accessible to the firmware on the compute node, and wherein the TPM on each of the compute nodes is provisioned with a platform certificate and a signed attestation key (AK) certificate;
assigning one of the compute nodes a role of master compute node and each of the remaining one(s) of the compute nodes a role of slave compute node;
sending a quote request from the master compute node to each slave compute node, wherein the quote request from the master compute node to each respective slave compute node is in the form of a "I am master" message and includes a nonce and a platform configuration register (PCR) digest list of specific PCR contents requested from the slave compute node's TPM, and wherein sending the quote request is controlled by the firmware on the master compute node;
sending, in response to receiving the quote request, a quote response from each respective slave compute node to the master compute node, wherein the quote response includes the AK certificate of the slave compute node's TPM, and wherein sending the quote response is controlled by the firmware on the slave compute node;
sending, after receiving the quote response from each respective slave compute node, a "Train" message from the master compute node to each respective slave compute node to disable the respective slave compute node's TPM and to trigger completion of node merge operations that enable processor bus communications for full system connectivity.

2. The method as recited in claim 1, wherein the AK certificate of each compute node's TPM is created by the TPM utilizing a network connection to a trusted certificate authority (CA) and stored in the TPM at manufacturing TPM provisioning time making use of a TPM provisioning process that includes attestation key enrollment for generating a primary attestation signing key (AK) used to sign the AK certificate.

3. The method as recited in claim 1, wherein the firmware on the master compute node that controls sending the quote request includes Hostboot code, and wherein the firmware on each respective slave compute node that controls sending the quote response includes Hostboot code.

4. The method as recited in claim 1, further comprising:
validating, at a remote trusted third party, after completion of node merge operations but prior to trusting the multi-node system to secure workloads, the credentials of each respective slave compute node based on a quote received from the master compute node's TPM and a TPM event log received from the firmware on the master compute node.

5. The method as recited in claim 1, wherein each compute node's TPM includes multiple platform configuration registers (PCRs), including PCR0, PCR1, PCR2, PCR3, PCR4, PCR5, PCR6, and PCR7.

6. The method as recited in claim 5, further comprising:
performing, at each respective slave compute node, in response to receiving the quote request from the master compute node, the following operations:
re-creating a primary attestation signing key (AK) used to sign the AK certificate;
reading the AK certificate of the slave compute node's TPM;
extending PCR1 of the slave compute node's TPM with a hash of the AK certificate;
adding the hash of the AK certificate to a TPM event log associated with the slave compute node's TPM.

7. The method as recited in claim 5, wherein the TPM on each of the compute nodes includes a primary AK used to sign the AK certificate, the method further comprising:
performing, at each respective slave compute node, in response to receiving the quote request from the master compute node, the following operations:
reading the primary AK of the slave compute node's TPM;
reading the AK certificate of the slave compute node's TPM;
extending PCR1 of the slave compute node's TPM with a hash of the AK certificate;
adding the hash of the AK certificate to a TPM event log associated with the slave compute node's TPM.

8. The method as recited in claim 5, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, the AK certificate of the slave compute node's TPM, and a TPM event log associated with the slave compute node's TPM.

9. The method as recited in claim 8, further comprising:
performing, at the master compute node, in response to receiving the quote response from each respective slave compute node, the following operations:
extending PCR1 of the master compute node's TPM with a hash of the quote response from the slave compute node;
adding the quote response to a TPM event log associated with the master compute node's TPM.

10. The method as recited in claim 9, further comprising:
validating, at the master compute node, after receiving the quote response from each respective slave compute node but prior to enabling node merge operations, the credentials of each respective slave compute node.

11. The method as recited in claim 10, wherein the validating, at the master compute node, after receiving the quote response from each respective slave compute node but prior to the enabling node merge operations, the credentials of each respective slave compute node includes:
analyzing the quote response received from each slave compute node for any prohibited level of firmware;
analyzing the quote response received from each slave compute node for an authentic AK certificate.

12. The method as recited in claim 10, wherein sending, after receiving the quote response from each respective slave compute node, a "Train" message from the master compute node to each respective slave compute node to disable the respective slave compute node's TPM and to trigger completion of the node merge operations that enable processor bus communications for full system connectivity includes sending the "Train" message in response to validating the credentials of each respective slave compute node.

13. The method as recited in claim 12, further comprising:
    disabling, at each respective slave compute node, in response to receiving the "Train" message from the master compute node, each respective slave compute node's TPM.

14. The method as recited in claim 9, wherein sending, after receiving the quote response from each respective slave compute node, a "Train" message from the master compute node to each respective slave compute node to disable the respective slave compute node's TPM and to trigger completion of the node merge operations that enable processor bus communications for full system connectivity includes sending the "Train" message in response to receiving the quote response from each respective slave compute node.

15. The method as recited in claim 14, further comprising:
    disabling, at each respective slave compute node, in response to receiving the Train message from the master compute node, each respective slave compute node's TPM.

16. The method as recited in claim 15, further comprising:
    validating, at a remote trusted third party, after the completion of the node merge operations but prior to trusting the multi-node system to secure workloads, the credentials of each respective slave compute node.

17. The method as recited in claim 16, wherein validating, at a remote trusted third party, after the completion of the node merge operations but prior to trusting the multi-node system to secure workloads, the credentials of each respective slave compute node includes:
    the trusted third party retrieving, via a remote attestation process, a quote from the master compute node's TPM and a TPM event log from the firmware on the master compute node.

18. A multi-node computer system, comprising:
    compute nodes, each having a processor, a memory, and a bus that couples various compute node components including the memory to the processor, wherein each of the compute nodes includes firmware and a trusted platform module (TPM) accessible to the firmware on the compute node, wherein the TPM on each of the compute nodes is provisioned with a platform certificate and a signed attestation key (AK) certificate, wherein the compute nodes are connected to be available for merger into a single multi-node system, and wherein one of the compute nodes is assigned a role of master compute node and each of the remaining one(s) of the compute nodes is assigned a role of slave compute node, the multi-node computer system configured to perform a method comprising:
        sending a quote request from the master compute node to each slave compute node, wherein the quote request from the master compute node to each respective slave compute node is in the form of a "I am master" message and includes a nonce and a platform configuration register (PCR) digest list of specific PCR contents requested from the slave compute node's TPM, and wherein sending the quote request is controlled by the firmware on the master compute node;
        sending, in response to receiving the quote request, a quote response from each respective slave compute node to the master compute node, wherein the quote response includes the AK certificate of the slave compute node's TPM, and wherein sending the quote response is controlled by the firmware on the slave compute node;
        sending, after receiving the quote response from each respective slave compute node, a "Train" message from the master compute node to each respective slave compute node to disable the respective slave compute node's TPM and to trigger completion of node merge operations that enable processor bus communications for full system connectivity.

19. The multi-node computer system as recited in claim 18, wherein each compute node's TPM includes multiple platform configuration registers (PCRs), including PCR0, PCR1, PCR2, PCR3, PCR4, PCR5, PCR6, and PCR7.

20. The multi-node computer system as recited in claim 19, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, the AK certificate of the slave compute node's TPM, and a TPM event log associated with the slave compute node's TPM.

21. A computer program product for merging compute nodes into a single multi-node system, each compute node having a processor, a memory, and a bus that couples various compute node components including the memory to the processor, wherein each of the compute nodes includes firmware and a trusted platform module (TPM) accessible to the firmware on the compute node, wherein the TPM on each of the compute nodes is provisioned with a platform certificate and a signed attestation key (AK) certificate, wherein the compute nodes are connected to be available for merger into the single multi-node system, wherein one of the compute nodes is assigned a role of master compute node and each of the remaining one(s) of the compute nodes is assigned a role of slave compute node, the computer program product comprising a computer readable storage medium having program code embodied therewith, the program code when collectively executed by the processor on each of the compute nodes cause the compute nodes to perform a method comprising:
    sending a quote request from the master compute node to each slave compute node, wherein the quote request from the master compute node to each respective slave compute node is in the form of a "I am master" message and includes a nonce and a platform configuration register (PCR) digest list of specific PCR contents requested from the slave compute node's TPM, and wherein sending the quote request is controlled by the firmware on the master compute node;
    sending, in response to receiving the quote request, a quote response from each respective slave compute node to the master compute node, wherein the quote response includes the AK certificate of the slave compute node's TPM, and wherein sending the quote response is controlled by the firmware on the slave compute node;
    sending, after receiving the quote response from each respective slave compute node, a "Train" message from the master compute node to each respective slave compute node to disable the respective slave compute node's TPM and to trigger completion of node merge operations that enable processor bus communications for full system connectivity.

22. The computer program product as recited in claim 21, wherein each compute node's TPM includes multiple platform configuration registers (PCRs), including PCR0, PCR1, PCR2, PCR3, PCR4, PCR5, PCR6, and PCR7.

23. The computer program product as recited in claim 22, wherein the quote response sent from each respective slave compute node to the master compute node includes a structured message containing the slave compute node's ID, the nonce received from the master compute node in the quote request, TPM quote data, a TPM quote signature, contents of PCR0-7 of the slave compute node's TPM, the AK certificate of the slave compute node's TPM, and a TPM event log associated with the slave compute node's TPM.

24. A method comprising:
providing compute nodes, each having a processor, a memory, and a bus that couples various compute node components including the memory to the processor, wherein each of the compute nodes includes firmware and a trusted platform module (TPM) accessible to the firmware on the compute node, wherein the TPM on each of the compute nodes is provisioned with a platform certificate and a signed attestation key (AK) certificate, and wherein the AK certificate of each compute node's TPM is created by the TPM utilizing a network connection to a trusted certificate authority (CA) and stored in the TPM at manufacturing TPM provisioning time making use of a TPM provisioning process that includes attestation key enrollment for generating a primary attestation signing key (AK) used to sign the AK certificate;
connecting the compute nodes to be available for merger into a single multi-node system, wherein the connecting operation includes connecting each of the compute nodes using a secure trusted communications channel;
assigning one of the compute nodes a role of master compute node and each of the remaining one(s) of the compute nodes a role of slave compute node;
sending a quote request from the master compute node to each slave compute node, wherein the quote request from the master compute node to each respective slave compute node is in the form of a "I am master" message and includes a nonce and a platform configuration register (PCR) digest list of specific PCR contents requested from the slave compute node's TPM, and wherein sending the quote request is controlled by the firmware on the master compute node;
sending, in response to receiving the quote request, a quote response from each respective slave compute node to the master compute node, wherein the quote response includes the AK certificate of the slave compute node's TPM, and wherein sending the quote response is controlled by the firmware on the slave compute node;
sending, after receiving the quote response from each respective slave compute node, a "Train" message from the master compute node to each respective slave compute node to disable the respective slave compute node's TPM and to trigger completion of node merge operations that enable processor bus communications for full system connectivity.

25. A multi-node computer system, comprising:
compute nodes, each having a processor, a memory, and a bus that couples various compute node components including the memory to the processor, wherein each of the compute nodes includes firmware and a trusted platform module (TPM) accessible to the firmware on the compute node, wherein the TPM on each of the compute nodes is provisioned with a platform certificate and a signed attestation key (AK) certificate, wherein the AK certificate of each compute node's TPM was created by the TPM utilizing a network connection to a trusted certificate authority (CA) and stored in the TPM at manufacturing TPM provisioning time making use of a TPM provisioning process that includes attestation key enrollment for generating a primary attestation signing key (AK) used to sign the AK certificate;
a secure trusted communications channel connecting the compute nodes to be available for merger into a single multi-node system;
wherein one of the compute nodes is assigned a role of master compute node and each of the remaining one(s) of the compute nodes is assigned a role of slave compute node, the multi-node computer system configured to perform a method comprising:
sending a quote request from the master compute node to each slave compute node, wherein the quote request from the master compute node to each respective slave compute node is in the form of a "I am master" message and includes a nonce and a platform configuration register (PCR) digest list of specific PCR contents requested from the slave compute node's TPM, and wherein sending the quote request is controlled by the firmware on the master compute node;
sending, in response to receiving the quote request, a quote response from each respective slave compute node to the master compute node, wherein the quote response includes the AK certificate of the slave compute node's TPM, and wherein sending the quote response is controlled by the firmware on the slave compute node;
sending, after receiving the quote response from each respective slave compute node, a "Train" message from the master compute node to each respective slave compute node to disable the respective slave compute node's TPM and to trigger completion of node merge operations that enable processor bus communications for full system connectivity.

* * * * *